US011729098B2

(12) United States Patent
Kommula et al.

(10) Patent No.: US 11,729,098 B2
(45) Date of Patent: Aug. 15, 2023

(54) METHODS AND APPARATUS TO MANAGE A PHYSICAL NETWORK TO REDUCE NETWORK DEPENDENCIES IN A MULTI-FABRIC VIRTUAL NETWORK

(71) Applicant: VMware, Inc., Palo Alto, CA (US)

(72) Inventors: Raja Kommula, Cupertino, CA (US); Thayumanavan Sridhar, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 17/751,282

(22) Filed: May 23, 2022

(65) Prior Publication Data

US 2022/0286393 A1    Sep. 8, 2022

Related U.S. Application Data

(63) Continuation of application No. 16/799,505, filed on Feb. 24, 2020, now Pat. No. 11,343,184, which is a (Continued)

(51) Int. Cl.
*H04L 45/74* (2022.01)
*G06F 9/455* (2018.01)
(Continued)

(52) U.S. Cl.
CPC .......... *H04L 45/74* (2013.01); *G06F 9/45558* (2013.01); *H04L 12/462* (2013.01);
(Continued)

(58) Field of Classification Search
None
See application file for complete search history.

(56) References Cited

U.S. PATENT DOCUMENTS 6,978,384 B1    12/2005 Milliken
8,204,061 B1    6/2012  Sane et al.
(Continued)

FOREIGN PATENT DOCUMENTS

WO    2015069573    5/2015

OTHER PUBLICATIONS

Green, "LAG vs LBT for vSwitch Uplinks in vSphere," Mar. 26, 2015, Virtualization & Cloud Review, retrieved on Oct. 29, 2019 [https://virtualizationreview.com/articles/2015/03/26/load-balancing-vsphere-vswitch-uplinks.aspx] (5 pages).

(Continued)

*Primary Examiner* — Christine T Duong
(74) *Attorney, Agent, or Firm* — Hanley, Flight and Zimmerman, LLC

(57) ABSTRACT

An example first server host includes processor circuitry to: connect a virtual network interface card (vNIC) of the first server host to a first physical network interface card (pNIC) and a second pNIC of the first server host; establish an inter-switch link between first and second switches, the first switch and the first server host in a first network fabric, the second switch and a second server host in a second network fabric; and cause transmission of a first and second network packets from the vNIC of the first server host, the first and second network packets to be delivered to the second server host via the inter-switch link, the first network packet to be transmitted via the first pNIC when utilization of the first pNIC does not satisfy a threshold, the second network packet to be transmitted via the second pNIC when the utilization satisfies the threshold.

21 Claims, 10 Drawing Sheets

Related U.S. Application Data continuation of application No. 16/044,296, filed on Jul. 24, 2018, now Pat. No. 10,680,947.

(51) Int. Cl.
| | |
|---|---|
| *H04L 12/46* | (2006.01) |
| *H04L 49/201* | (2022.01) |
| *H04L 49/25* | (2022.01) |
| *H04L 101/622* | (2022.01) |

(52) U.S. Cl.
CPC ........ *H04L 12/4641* (2013.01); *H04L 49/203* (2013.01); *H04L 49/25* (2013.01); *H04L 2101/622* (2022.05)

(56) References Cited

U.S. PATENT DOCUMENTS

| | | | |
|---|---|---|---|
| 10,659,391 | B1 | 5/2020 | Kommula et al. |
| 10,680,947 | B2 | 6/2020 | Kommula et al. |
| 10,708,198 | B1 | 7/2020 | Kommula et al. |
| 11,343,184 | B2 | 5/2022 | Kommula et al. |
| 2003/0036896 | A1 | 2/2003 | Skingsley et al. |
| 2006/0221813 | A1 | 10/2006 | Scudder et al. |
| 2012/0033672 | A1 | 2/2012 | Page et al. |
| 2013/0088971 | A1 | 4/2013 | Ananthram et al. |
| 2014/0003436 | A1 | 1/2014 | Wang |
| 2014/0105213 | A1 | 4/2014 | A K et al. |
| 2014/0196037 | A1 | 7/2014 | Gopalan |
| 2014/0250220 | A1 | 9/2014 | Kapadia et al. |
| 2015/0127797 | A1 | 5/2015 | Attar et al. |
| 2015/0312134 | A1 | 10/2015 | Kapadia et al. |
| 2016/0091685 | A1 | 3/2016 | Raza et al. |
| 2017/0019328 | A1 | 1/2017 | Moreno et al. |
| 2017/0026461 | A1 | 1/2017 | Boutros et al. |
| 2017/0085395 | A1 | 3/2017 | Koponen et al. |
| 2017/0346885 | A1* | 11/2017 | Jiang .................. H04L 45/7453 |
| 2018/0176145 | A1 | 6/2018 | Sharma et al. |
| 2018/0359215 | A1* | 12/2018 | Khare .................... H04L 49/70 |
| 2019/0020555 | A1 | 1/2019 | Tayal et al. |
| 2019/0020575 | A1 | 1/2019 | Manthiramoorhy et al. |
| 2019/0028382 | A1 | 1/2019 | Kommula et al. |
| 2019/0230011 | A1 | 7/2019 | Gandham et al. |
| 2019/0230035 | A1 | 7/2019 | Rao et al. |
| 2019/0280968 | A1 | 9/2019 | Sreenivasagaperurnal et al. |
| 2020/0036632 | A1 | 1/2020 | Kommula et al. |
| 2020/0195555 | A1 | 6/2020 | Kommula et al. |
| 2020/0236065 | A1 | 7/2020 | Kommula et al. |

OTHER PUBLICATIONS

International Searching Authority, "International Search Report," dated Nov. 7, 2019 in connection with International Patent Application No. PCT/US2019/043114 (5 pages).

International Searching Authority, "Written Opinion," dated Nov. 7, 2019 in connection with International Patent Application No. PCT/US2019/043114 (7 pages).

Luo et al., "Design and Implementation of TCP Data Probes for Reliable and Metric-Rich Network Path Monitoring," USENIX'09 Proceedings of the 2009 Conference on USENIX Annual Technical Conference, Jun. 2009 (15 pages).

United States Patent and Trademark Office, "Corrected Notice of Allowability," dated Apr. 29, 2020 in connection with U.S. Appl. No. 16/255,583 (9 pages).

United States Patent and Trademark Office, "Corrected Notice of Allowability," dated Apr. 9, 2020 in connection witgh U.S. Appl. No. 16/255,580 (2 pages).

United States Patent and Trademark Office, "Corrected Notice of Allowability," dated Jun. 5, 2020 in connection with U.S. Appl. No. 16/255,583 (8 pages).

United States Patent and Trademark Office, "Final Rejection," dated Oct. 21, 2021 in connection with U.S. Appl. No. 16/799,505 (10 pages).

United States Patent and Trademark Office, "Non-Final Office Action," dated May 7, 2021 in connection with U.S. Appl. No. 16/799,505 (11 pages).

United States Patent and Trademark Office, "Notice of Allowance and Fee(s) Due," dated Feb. 8, 2022 in connection with U.S. Appl. No. 16/799,505 (6 pages).

United States Patent and Trademark Office, "Notice of Allowance," dated Feb. 26, 2020 in connection with U.S. Appl. No. 16/255,583 (8 Pages).

United States Patent and Trademark Office, "Notice of Allowance," dated Jan. 8, 2020 in connection witgh U.S. Appl. No. 16/255,580 (7 pages).

United States Patent and Trademark Office, "Notice of Allowance," dated Sep. 11, 2019 in connection witgh U.S. Appl. No. 16/044,296 (8 pages).

United States Patent and Trademark Office, "Supplemental Notice of Allowability," dated Dec. 30, 2019, in connection with U.S. Appl. No. 16/044,296 (2 pages).

United States Patent and Trademark Office, "Supplemental Notice of Allowability," dated Feb. 11, 2020 in connection with U.S. Appl. No. 16/044,296 (2 pages).

United States Patent and Trademark Office, "Supplemental Notice of Allowability," dated May 8, 2020 in connection with U.S. Appl. No. 16/044,296 (6 pages).

* cited by examiner

SPANNING TREE PROTOCOL (STP) TO ELIMINATE LOOPS IN NETWORK TOPOLOGY

FLOODING IN A NETWORK EMPLOYING LOAD-BASED TEAMING (LBT)

EMPLOYING SPINE SWITCH TO PROVIDE HIGH AVAILABILE NETWORK

EXAMPLE LOOP ELIMINATION USING LBT EGRESS CONTROL BIT

EXAMPLE NETWORK ISOLATION PREVENTION
THROUGH STP-RESILIENT INTER-SWITCH LINK

METHODS AND APPARATUS TO MANAGE A PHYSICAL NETWORK TO REDUCE NETWORK DEPENDENCIES IN A MULTI-FABRIC VIRTUAL NETWORK

RELATED APPLICATION

This patent arises from a continuation of U.S. patent application Ser. No. 16/799,505, which was filed on Feb. 24, 2020, which was a continuation of U.S. patent application Ser. No. 16/044,296, (Now U.S. Pat. No. 10,680,947) which was filed on Jul. 24, 2018. U.S. patent application Ser. No. 16/799,505 and U.S. patent application Ser. No. 16/044,296 are hereby incorporated herein by reference in their entireties. Priority to U.S. patent application Ser. No. 16/799,505 and U.S. patent application Ser. No. 16/044,296 is hereby claimed.

FIELD OF THE DISCLOSURE

The present disclosure relates generally to network-based computing and, more particularly, to methods and apparatus to manage a physical network to reduce network dependencies in a multi-fabric virtual network.

BACKGROUND

Virtualizing computer systems provides benefits such as the ability to execute multiple computer systems on a single hardware computer, replicating computer systems, moving computer systems among multiple hardware computers, and so forth. "Infrastructure as a Service" (also commonly referred to as "IaaS") generally describes a suite of technologies provided by a service provider as an integrated solution to allow for elastic creation of a virtualized, networked, and pooled computing platform (sometimes referred to as a "cloud computing platform"). Enterprises may use IaaS as a business-internal organizational cloud computing platform (sometimes referred to as a "private cloud") that gives an application developer access to infrastructure resources, such as virtualized servers, storage, and networking resources. By providing ready access to the hardware resources required to run an application, the cloud computing platform enables developers to build, deploy, and manage the lifecycle of a web application (or any other type of networked application) at a greater scale and at a faster pace than ever before.

Cloud computing environments may be composed of many processing units (e.g., servers). The processing units may be installed in standardized frames, known as racks, which provide efficient use of floor space by allowing the processing units to be stacked vertically. The racks may additionally include other components of a cloud computing environment such as storage devices, networking devices (e.g., switches), etc.

Figure 1:
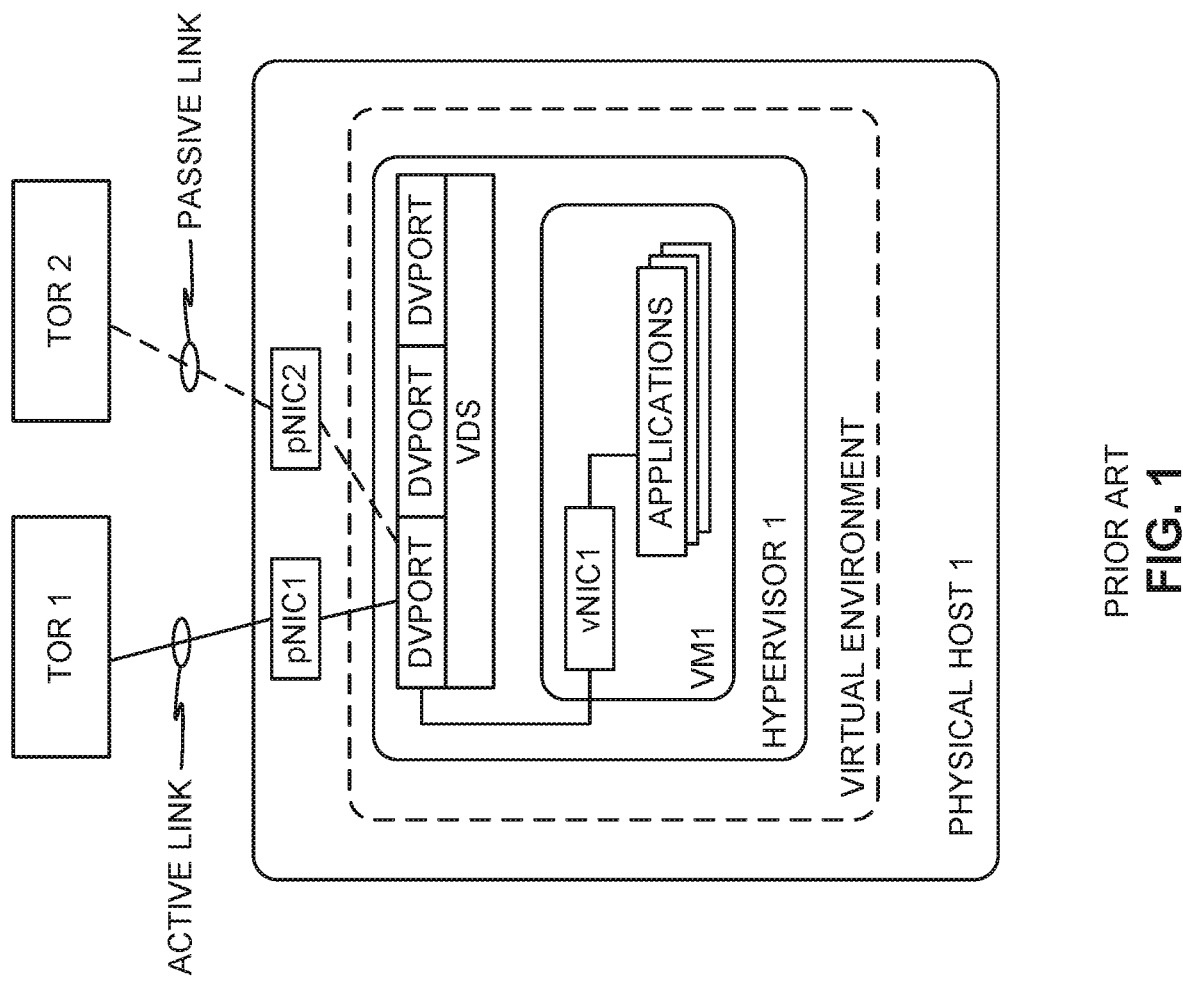
FIG. 1 is an example network topology in which a Load-Based Teaming (LBT) policy is used for load balancing across physical network interface cards (pNICs) that connect a physical host to two top-of-rack (ToR) switches in a physical server rack.

Wherever possible, the same reference numbers are used throughout the drawing(s) and accompanying written description to refer to the same or like parts. Connecting lines or connectors shown in the various figures presented are intended to represent example functional relationships and/or physical or logical couplings between the various elements.

Descriptors "first," "second," "third," etc. are used herein when identifying multiple elements or components which may be referred to separately. Unless otherwise specified or understood based on their context of use, such descriptors are not intended to impute any meaning of priority or ordering in time but merely as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Modern datacenters are equipped with physical racks in which multiple physical server hosts are installed. A physical server host ("host") typically includes up to four 10/25 gigabit-per-second (Gbps) physical network interface cards (pNICs) for high-availability purposes. These pNICs are typically connected to one or more switches called Top-of-Rack (ToR) switches of corresponding physical rack. In some examples, hosts in datacenters can be equipped with two or more pNICs, which are connected to multiple ToR switches for redundancy. This kind of connectivity provides a host with connectivity to other hosts via multiple network fabrics across the multiple ToR switches. The multiple network fabrics provide multiple ways to balance network traffic load across multiple pNICs of the host. To implement a virtual network, a host includes a virtual network (vnetwork) distributed switch (VDS) in which multiple distributed virtual ports (dvports) can be instantiated to operate as virtual-to-physical network conduits between pNICs of the host and virtual network interface cards (vNICs) of virtual machines (VMs) running on the host so that network traffic of the VMs can flow between the virtual network to which the VMs are connected and a physical network through which the pNICs of the host connect to the ToR switches.

In some datacenters, administrators employ Load-Based Teaming (LBT) policy for load balancing network traffic across network links. LBT, also known as "route based on physical NIC load," is a load balancing network protocol used to load balance network traffic across different pNICs based on link utilizations of active pNICs. When an application in a VM makes a request for a network connection to communicate over a network, a dvport is created and/or allocated to the requesting application and is bound to a pNIC. In this manner, the pNIC is the physical network resource that serves the dvport in the virtual network. In some examples, the dvport may be bound to multiple pNICs. However, the dvport is active on only one pNIC at a time (e.g., a dvport is not active across two pNICs at a time), which is also called Active-Passive mode. An example active link and passive link configuration for a dvport is illustrated in FIG. 1, in which a solid line between a ToR 1 switch and pNIC1 represents an active link of an LBT configuration, and a dashed line between a ToR 2 switch and pNIC2 represents a passive link of the LBT configuration. Subsequent requests for network connections can result in additional dvports being created and bound to a pNIC on which one or more existing dvports are already active. When the utilization of the pNIC exceeds 75% of the total network traffic capacity of the pNIC, one or more dvports assigned to the pNIC is/are moved to a different, less utilized pNIC. Thus, employing LBT involves initially selecting only one pNIC for all outgoing traffic of a dvport, and multiple created/allocated dvports must share the single pNIC until the 75% utilization threshold is exceeded for that pNIC. Only after the 75% utilization threshold is exceeded for the pNIC does the LBT policy permit moving one or more dvports onto a less utilized pNIC so that none of the active pNICs exceeds the 75% utilization threshold. Another policy consideration when implementing LBT is that the active status of dvport on a pNIC is applicable only to outgoing (egress) traffic from the dvport to a ToR switch. That is, egress traffic is sent from the dvport only on the active pNIC link, while incoming (ingress) traffic from one or more ToR switches is accepted by the dvport from any active or passive pNIC link.

Physical networks of some physical rack architectures include network loops in which multiple paths to destination nodes include one or more paths that form loops along which packets to those destination nodes travel repeatedly without terminating at their destination nodes. Such network loops can lead to network traffic overwhelming or saturating network resources along network loops. Examples disclosed herein provide LBT egress control values in network packets to substantially reduce or eliminate network congestion effects of network loops. In this manner, network packets do not unnecessarily consume network resources and decrease network performance by causing the network resources along network loops to continuously process looping network packets. Thus, examples disclosed herein to locate LBT egress control values in network packets are useful to substantially reduce or eliminate packets repeatedly following network loops along physical network topologies. By using LBT egress control values as disclosed herein, network loop avoidance by an LBT policy is no longer dependent on network topology. Instead, in examples disclosed herein, LBT egress control values are used to control how nodes at subsequent hops handle incoming network packets in network configurations employing LBT policies so that the network packets do not flow repeatedly along network loops.

In addition, physical networks of some physical rack architectures include nodes that are in circuit with ToR switches but do not have a redundant path to other nodes when one of the ToR switches fails. As such, when a connection between a node and a first ToR switch fails, the node becomes isolated from other nodes in circuit with the first ToR switch and, thus, is unreachable by those nodes. Examples disclosed herein establish inter-switch links between ToR switches to substantially reduce or eliminate network isolation of hosts. Such inter-switch links can remain in a network topology so that when a packet sent from a host in circuit with one ToR switch is destined to a host in circuit with another ToR switch, the network packet can travel between the ToR switches through the inter-switch link to reach the destination host. In this manner, network path redundancy can be provided by programming physical networks at ToR switches to establish inter-switch links without needing to communicate with hypervisors in hosts to control programming of virtual networks at the nodes. This simplifies management of networks in a physical rack architecture by controlling redundant, failover path configurations by ToR switches at the physical network.

Figure 2:
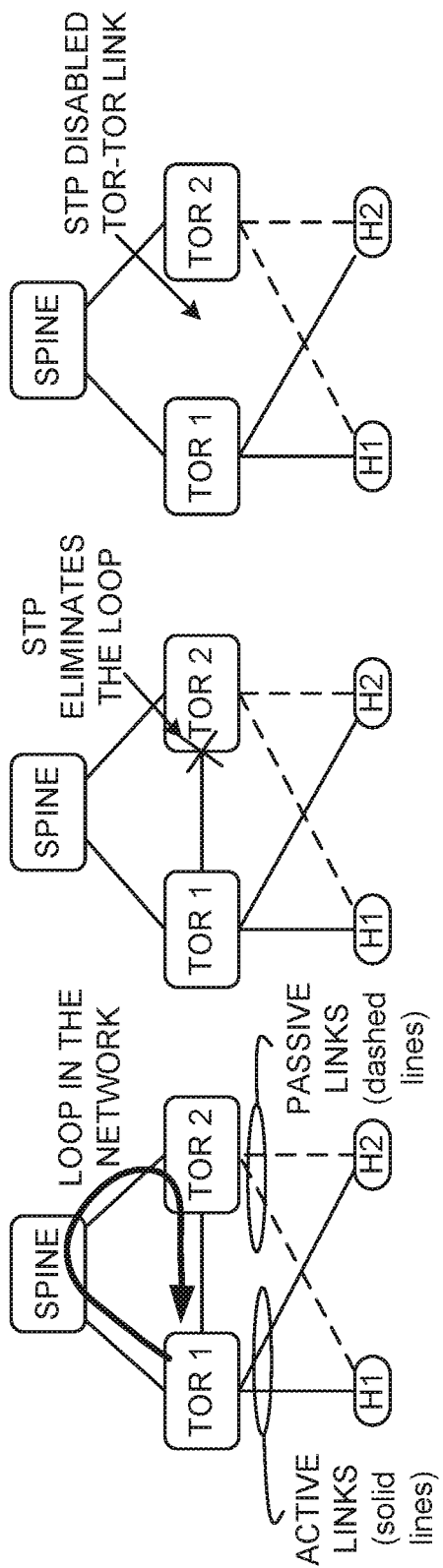
FIG. 2 illustrates how a prior Spanning Tree Protocol (STP) is used to eliminate loops in a network topology.
Figure 3:
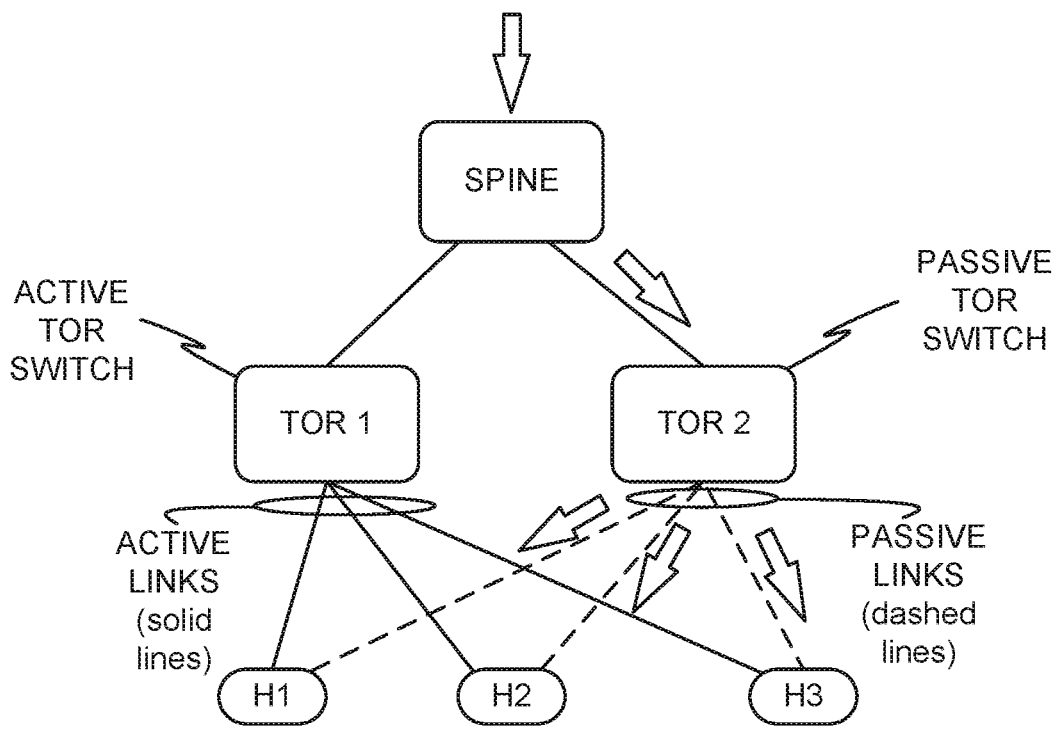
FIG. 3 illustrates how prior communications between spine switches and ToR switches in a physical server rack result in network flooding when an LBT policy is employed.
Figure 4:
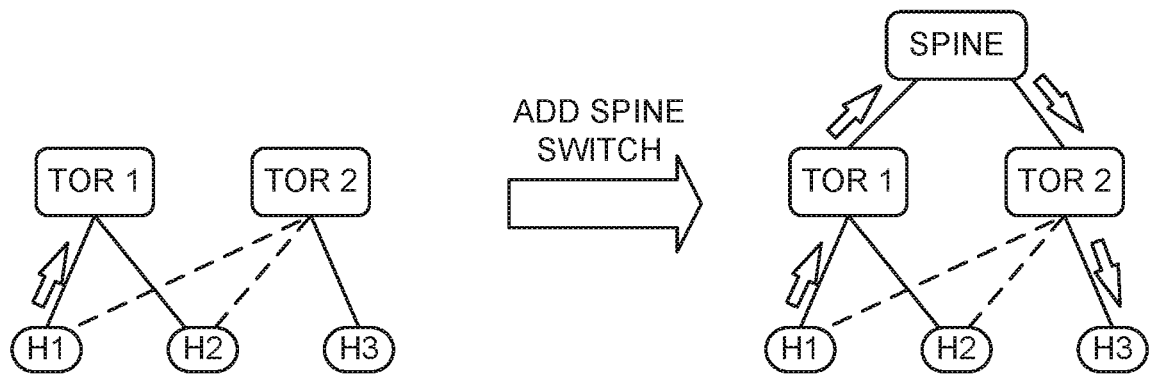
FIG. 4 illustrates a prior technique of employing a spine switch to provide high availability for networks between physical hosts connected to ToR switches.

FIGS. 2-4 depict example problems of network loops and network isolation faced in prior implementations of physical networks between hosts and switches in physical server racks. The problems described below in connection with FIGS. 2-4 are provided merely as examples and are not intended to limit the scope of the claims and/or applicability of the claims to addressing, solving, overcoming, etc. other problems not specifically described herein. The examples depicted in FIGS. 2-4 described below are provided for the benefit of the interested reader to facilitate the understanding of some issues facing industries that offer and/or employ cloud computing and virtual computing technologies such as computing services that employ software defined data centers (SDDCs) to provide physical compute resources to provide Infrastructure as a Service (IaaS), Platform as a Service (PaaS), Network as a Service (NaaS), Software as a Service (SaaS), etc. services to customers. In FIGS. 2-4, solid lines between ToR switches and hosts represent active links of an LBT configuration, and dashed lines between ToR switches and hosts represent passive links of the LBT configuration.

FIG. 2 illustrates how a prior Spanning Tree Protocol (STP) is used to eliminate loops in a network topology. The example problem described in connection with FIG. 2 is that of a network's performance being dependent on network topology when employing an LBT policy. For example, LBT assumes a loop free network, which is not always true in a layer 2 (L2) network. Layer 2 of the Open Systems Interconnection model (OSI model) is the data link layer that specifies how frames are transmitted between nodes on the physical layer (Layer 1). In the example of FIG. 2, an L2 network loop exists between a spine switch and two ToR switches (ToR 1 and ToR 2). The loop results from an inter-switch link between the ToR switches providing an alternate path for traffic destined to one of the hosts H1, H2. When a loop is present, outgoing traffic (e.g., egress traffic) from the first ToR switch (ToR 1) could be repeatedly looped back from the spine switch through the second ToR switch (ToR 2) toward the first ToR switch (ToR 1) because that alternate path is valid for reaching a destined one of the hosts H1, H2.

A network loop in FIG. 2 could also result when a packet received at the first ToR switch (ToR 1) from the second ToR switch (ToR 2) has a destination node specified as the host H1, for example. In accordance with L2 packet routing, the first ToR switch (ToR 1) retransmits the packet on any link that forms a path toward the destination node H1. Since the spine switch is along such a path, the first ToR switch (ToR 1) transmits the packet to the destination node H1 via an active link between the first ToR switch (ToR 1) and the destination node H1, and also transmits the packet through the spine switch along an alternate route to the destination node H1. As such, the packet transmission to the spine switch then travels along a continuous loop through the spine switch, the second ToR switch (ToR 2), and the first ToR switch (ToR 1).

A prior technique for eliminating loops involves an administrator enabling STP in the network or using switches that support L2 Multi-pathing (e.g., FabricPath or TRILL). STP removes loops, as depicted in FIG. 2, by disabling some ports of a ToR switch. However, STP only allows a single path between any two nodes, thus removing alternate, redundant paths. As such, it is challenging to provide high availability (HA) networks between nodes (e.g., by implementing multiple redundant network connections between nodes). An HA mode refers to resources being available for a high percentage (e.g., 99.999%) of the resources' expected duration of use. For example, an HA network is expected to be available even upon the failure of one or more network paths between nodes. A network can be made to operate in HA mode by providing redundant network paths between nodes should a single network path fail. Switches that support L2 Multi-pathing, such as FabricPath, remove loops while allowing multiple paths between any two nodes. In addition, Layer 3-based spine switches are spine switches that remove loops using addressing, routing, and/or traffic control at the network layer L3 (Layer 3) of the OSI model while also allowing multiple paths between any two nodes. However, such L2 Multi-pathing switches and/or L3-based spine switches are expensive and difficult to deploy.

FIG. 3 illustrates how prior communications between spine switches and ToR switches in a physical server rack result in network flooding when an LBT policy is employed. For example, because LBT is used in an Active-Passive mode in which a dvport of a host is active on only one pNIC at a time for connecting to a first ToR switch (e.g., referred to as an active ToR switch), the dvport can maintain a passive link with a second ToR switch (e.g., referred to as a passive ToR switch). In such examples, network flooding occurs when a packet reaches an inactive ToR switch, as shown in FIG. 3.

In FIG. 3, a rack is represented as having three hosts H1, H2, H3 connected to two ToR switches ToR 1, ToR 2, which are connected to a spine switch. The ToR 2 switch is an inactive ToR switch and, as such, does not know where VMs of the hosts H1, H2, H3 are located. As such, if a packet destined for a VM on the host H1 reaches the inactive ToR switch (ToR 2), it will flood the packet to every member port of the ingress virtual local area network (VLAN) implemented across all of the hosts H1, H2, and H3 because the inactive ToR switch (ToR 2) does not know where the destination VM is located. In a large network, it can be assumed that, on average, 50% of network traffic for the host H1 enters the inactive ToR switch (ToR 2). Using the above-described flooding scenario, this means that 50% of the traffic is flooded to every host H1, H2, H3 in the rack. As a result, such significant flooding reduces the throughput of each pNIC and leaves hosts vulnerable to distributed denial-of-service (DDOS) attacks that arise when malicious programs cause packets to flood a network such that network resources become inundated with traffic that disrupts network services because the network resources become unable to handle the significant traffic load.

FIG. 4 illustrates a prior technique of employing a costly spine switch to provide a HA mode for networks between hosts connected to ToR switches. As explained above, in HA mode, a network is available for use a significant percentage (e.g., 99.999%) of time during its expected duration of use. To enable such HA mode, hosts are equipped with multiple pNICs for redundancy. However, as also noted above, in LBT, a dvport is active on only one pNIC at a time (e.g., a dvport is not active across two pNICs at a time). As such, a host could lose network connectivity upon failure of one of its pNICs.

In FIG. 4, an example network topology on the left side includes two ToR switches (ToR 1, ToR 2) connected to multiple hosts H1, H2, H3 but not connected to a spine switch. Without a spine switch, the left-side network topology of FIG. 4 can experience network isolation of any of the hosts H1, H2, H3 through the loss of a single pNIC. For example, the first ToR switch (ToR 1) maintains active links with the first and second hosts H1, H2. However, the third host H3 has a failed pNIC that connects it to the first ToR switch (ToR 1). As such, the third host H3 is isolated from the first ToR switch (ToR 1) and from the first and second hosts H2, H3 in the left-side network topology of FIG. 4.

A prior technique of overcoming the network isolation of the host H3 shown in the left-side network topology of FIG. 4 involves adding a spine switch connected between the two ToR switches (ToR 1, ToR 2), as shown in the right-side network topology of FIG. 4. The added spine switch allows the third host H3 to no longer be isolated from the first ToR switch (ToR 1) and the first and second hosts H1, H2 even upon failure of one of its pNICs. That is, as shown in the right-side network topology, network traffic from the first host H1 can flow through the added spine switch to reach the third host H3. However, providing spine switches to prevent such network isolation scenarios as depicted in the left-side network topology of FIG. 4 increases deployment costs and configuration complexity.

Figure 5:
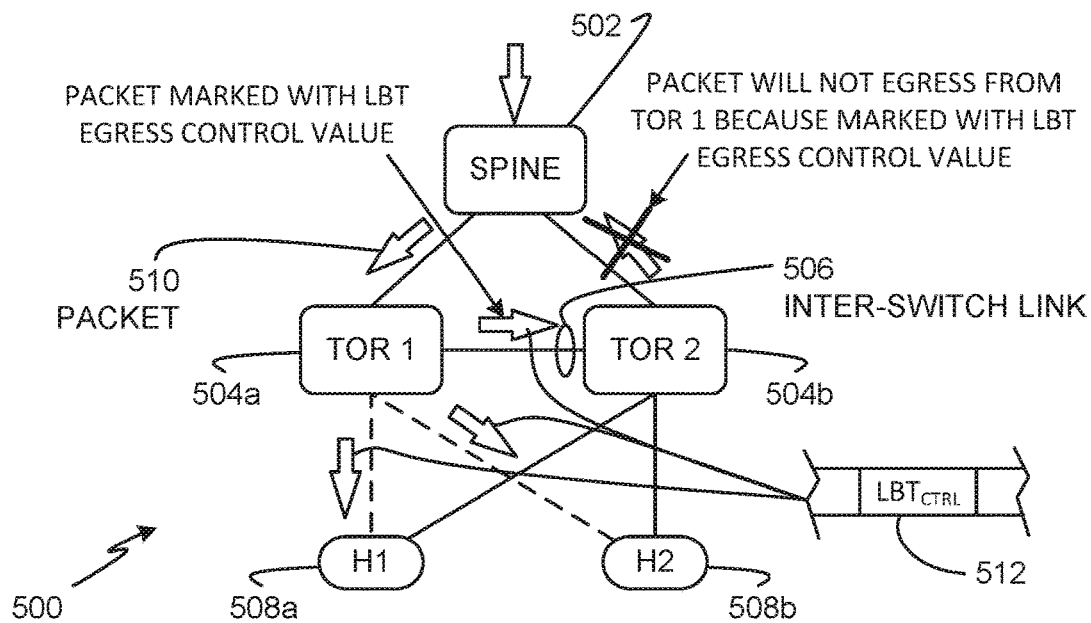
FIG. 5 depicts a disclosed example technique to substantially reduce or eliminate network congestion effects of network loops in a multi-fabric virtual network by providing LBT egress control values in packets.

FIG. 5 depicts an example disclosed technique for loop elimination in a multi-fabric virtual network by providing LBT egress control values in packets. An example network topology 500 of FIG. 5 includes a spine switch 502 in network communication with two ToR switches identified as a ToR 1 switch 504a and a ToR 2 switch 504b. The ToR switches 504a,b are connected to one another via an inter-switch link 506. In addition, each of the ToR switches 504a,b is connected to two hosts identified as a first host H1 508a and a second host H2 508b. An example first network fabric is formed by connections between the first host H1 508a and the first ToR switch 504a and between the first ToR switch 504a and the second host H2 508b. An example second network fabric is formed by connections between the first host H1 508a and the second ToR switch 504b and between the second ToR switch 504b and the second host H2 508b. In the illustrated example, the ToR switches 504a,b are configured to employ an LBT load balancing policy in Active-Passive mode. As part of the LBT policy, the example first and second hosts 508a,b are connected to the first ToR switch 504a through passive links (shown as dashed lines) and connected to the second ToR switch 504b through active links (shown as solid lines).

The hosts 508a,b of the illustrated example are double-connected hosts because each is connected to two ToR switches. Each of the ToR switches 504a,b keeps a media access control (MAC) address table of double-connected hosts and single-connected hosts (e.g., hosts connected to only a single ToR switch). For a double-connected host, either ToR switch or both ToR switches connected to the double-connected host can forward network packets to that host that are destined for that host. For a single-connected host, only the ToR switch connected to the single-connected host forwards network packets to that host that are destined for that host.

In the illustrated example of FIG. 5, the presence of the spine switch 502 connected to the ToR switches 504a,b and the inter-switch link 506 connected between the ToR switches 504a,b creates the possibility of a network loop between the first ToR switch 504a, the spine switch 502, and the second ToR switch 504b (e.g., similar to the loop in the network described above in connection with FIG. 2). To overcome such network traffic loop, the example ToR switches 504a,b of FIG. 5 are configured to selectively insert LBT egress control values in packets and detect LBT egress control values in packets in accordance with teachings of this disclosure to control when nodes and/or switches at subsequent hops are to not re-transmit, forward, relay, or egress received packets to subsequent nodes. In examples disclosed herein, an LBT egress control value can be implemented using a single bit (or multiple bits) in which setting the bit to one (or setting the multiple bits to a first multi-bit value) in a packet indicates that a switch/node at a subsequent hop is not to re-transmit, forward, relay, or egress the packet to a subsequent node, and setting the bit to zero (or setting the multiple bits to a second multi-bit value) indicates that the switch/node at the subsequent hop is to handle the packet in accordance with a traditional LBT policy (e.g., it is permissible to re-transmit, forward, relay, or egress the packet to the subsequent node). Alternatively, setting the bit to zero (or the second multi-bit value) may be used to indicate that the switch/node at the subsequent hop is not to re-transmit, forward, relay, or egress the packet to a subsequent node, and setting the bit one (or the first multi-bit value) causes the switch/node at the subsequent hop to handle the packet in accordance with a traditional LBT policy (e.g., it is permissible to re-transmit, forward, relay, or egress the packet to the subsequent node). Alternatively, the LBT egress control value can be implemented using multiple bits in which different multi-bit values are used to indicate when a switch/node at a subsequent hop should not re-transmit, forward, relay, or egress the packet to a subsequent node and when it is permissible for the switch/node at the subsequent hop to re-transmit, forward, relay, or egress the packet to the subsequent node (e.g., in accordance with a traditional LBT policy).

In examples disclosed herein, LBT egress control values are used to eliminate loops in a network. For example, referring to the example of FIG. 5, when a packet 510 sent by the spine switch 502 is received by the first ToR switch 504a via an ingress LBT port of the first ToR switch 504a, the first ToR switch 504a determines whether a network location (e.g., a MAC address for L2 transmissions) of a destination node (e.g., one or both of the hosts 508a,b) of the packet 510 is known to the first ToR switch 504a. In the illustrated example, the first ToR switch 504a stores known network locations of nodes (e.g., hosts H1 508a and H2 508b) in a MAC address table. Under an LBT policy, a ToR switch is aware of network locations of hosts with which the ToR switch is connected via an active link. As such, if the ToR switch is an active switch for a host specified as a destination node in a packet, the ToR switch knows the network location of that destination node. Otherwise, if a ToR switch is a passive switch for a host specified as a destination node in a packet, the network location of that destination node is unknown to the ToR switch.

In the illustrated example of FIG. 5, when the network location of the destination node specified in the network packet 510 is unknown to the first ToR switch 504a, the first ToR switch 504a adds an LBT egress control value 512 to the packet 510. The example first ToR switch 504a adds the LBT egress control value 512 to indicate that the packet 510 is not to be transmitted by the second ToR switch 504b (e.g., via an LBT port of the second ToR switch 504b) which is to receive the packet 510 from the first ToR switch 504a. In the illustrated example, the first ToR switch 504a locates or stores the LBT egress control value 512 in an LBT egress control field of an L2 header of the network packet 510 to control how the second ToR switch 504b handles the network packet 510. In accordance with teachings of this disclosure, the LBT egress control value 512 prevents the network packet 510 from following a network loop along the second ToR switch 504b, the spine switch 502 and the first ToR switch 504a by indicating to the second ToR switch 504b to not send the network packet 510 out on any other egress LBT ports.

The first ToR switch 504a broadcasts the network packet 510 on all of its egress ports to the second ToR switch 504b via the inter-switch link 506 and to the hosts 504a,b via passive links. By doing so, the first ToR switch 504a floods the network with the network packet 510. As such, the network packet 510 and the included LBT egress control value 512 arrive at the destination node which is one of the hosts 508a,b in the illustrated example and also arrive at the second ToR switch 504b. Since the network packet 510 includes the LBT egress control value 512, the second ToR switch 504b does not re-transmit the network packet 510. Since the first ToR switch 504a has already sent the network packet 510 on its egress LBT ports to all of its LBT-connected hosts 508a,b, the host specified as the destination node in the network packet 510 receives the network packet 510 from the first ToR switch 504a, thereby eliminating the need for the destination node to receive the network packet 510 from the second ToR switch 504b. As such, terminating the network packet 510 at the second ToR switch 504b through the use of the LBT egress control value 512 is acceptable.

Without the LBT egress control value disclosed herein, the second ToR switch 504b would forward the network packet along all routes through which the destination node (e.g., one of the hosts 508a,b) is reachable. As such, since the destination node is directly reachable as one of the hosts 508a,b connected to the second ToR switch 504b but is also reachable through the spine switch 502, this would result in the second ToR switch 504b sending the network packet 510 to one of the hosts 508a,b identified as the destination node in the network packet 510 and also to the spine switch 502. The network packet 510 sent to the spine switch 502 would follow a repetitive loop that includes the spine switch 502 and the two ToR switches 504a,b as discussed above in connection with FIG. 2, thereby unnecessarily consuming network resources and decreasing network performance by placing additional network load on the spine switch 502 and the two ToR switches 504a,b to continuously process the looping network packet 510 and any other looping network packets. Thus, examples disclosed herein to locate LBT egress control values 512 in network packets 510 are useful to substantially reduce or eliminate packets following network loops even when L2 network topologies include connections (e.g., the inter-switch link 506 of FIG. 5) that create physical network loops.

By using an LBT egress control value as disclosed herein, network loop avoidance by an LBT policy is no longer dependent on network topology as is the case with prior techniques such as STP techniques in which the STP is used to eliminate network loops by eliminating or tearing down inter-switch links between ToR switches such as the inter-switch link 506. Instead, in examples disclosed herein, the LBT egress control value 512 is used to control how nodes at subsequent hops (e.g., the first ToR switch 504a) handle incoming network packets in a network configuration in which an LBT policy is implemented so that the network packets do not flow along network loops even when inter-switch links (e.g., the inter-switch link 506) exist between ToR switches.

Figure 6:
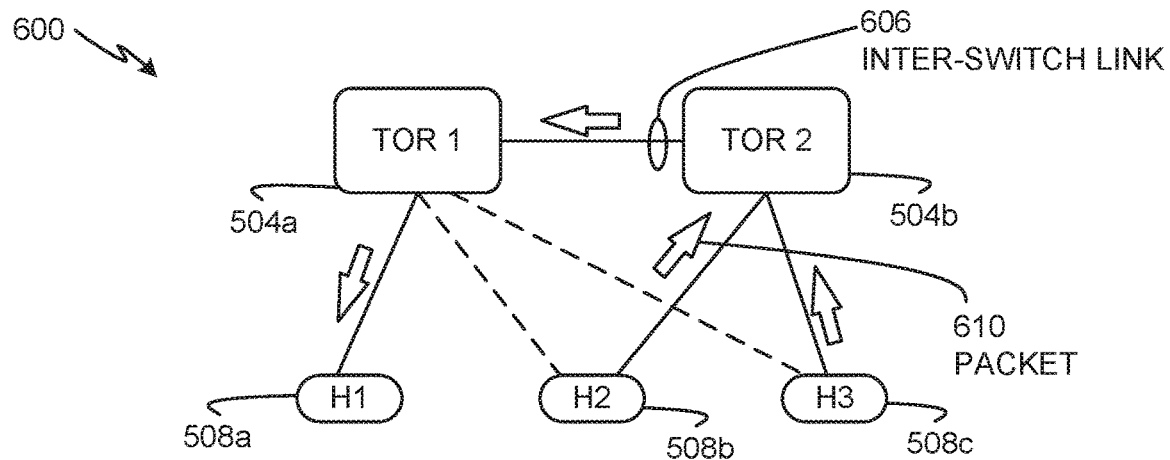
FIG. 6 depicts a disclosed example technique to substantially reduce or eliminate network isolation in a multi-fabric virtual network through the use of inter-switch links between ToR switches without use of a spine switch.

FIG. 6 depicts an example disclosed technique to prevent network isolation in a multi-fabric virtual network through the use of an inter-switch link between ToR switches without adding a spine switch. An example network topology 600 of FIG. 6 includes the first ToR switch 504a and the second ToR switch 504b. The ToR switches 504a,b are connected to one another via an inter-switch link 606. An example first network fabric is formed by connections between the first host H1 508a and the first ToR switch 504a and between the first ToR switch 504a and the second and third hosts 508b,c. An example second network fabric is formed by connections between the second host H2 508b and the second ToR switch 504b and between the second ToR switch 504b and the third host H3 508c. In the illustrated example, the ToR switches 504a,b are configured to employ an LBT load balancing policy in Active-Passive mode. In the example of FIG. 6, the example first ToR switch 504a is connected to the first host H1 508a via an active link (shown as a solid line) and is connected to the second host H2 508b and a third host H3 508c via passive links (shown as dashed lines). The example second ToR switch 504b is connected to the second host H2 508b and the third host H3 508c via active links (shown as solid lines). In the illustrated example, the first host H1 508a is not connected to the second ToR switch 504b either by an active link or a passive link. In the illustrated example, this is due to the first host H1 508a having a failed pNIC via which the first host H1 508a was connected to the second ToR switch 504b.

In the disclosed example of FIG. 6, even though the first host H1 508a loses one of its pNICs eliminating a direct connection between the first host H1 508a and the second ToR switch 504b, the inter-switch link 606 is connected between the ToR switches 504a,b so that the first host H1 508a can still reach the second host H2 508b and the third host H3 508c by indirectly communicating with the second host H2 508b and the third host H3 508c through the second ToR switch 504b via the inter-switch link 606. In the illustrated example, the inter-switch link 606 is not disabled by STP because there are no loops in the network. As such, the inter-switch link 606 can remain in the network topology 600 so that when a packet 610 sent by the second host H2 508b is destined for the first host H1 508a, the network packet 610 can travel through the second ToR switch 504b, across the inter-switch link 606, through the first ToR switch 504a, and to the first host H1 508a. In this manner, establishing the inter-switch link 606 between the ToR switches 504a,b substantially reduces or eliminates a network dependency of the first host H1 508a requiring a direct connection to the second ToR switch 504b.

Figure 7:
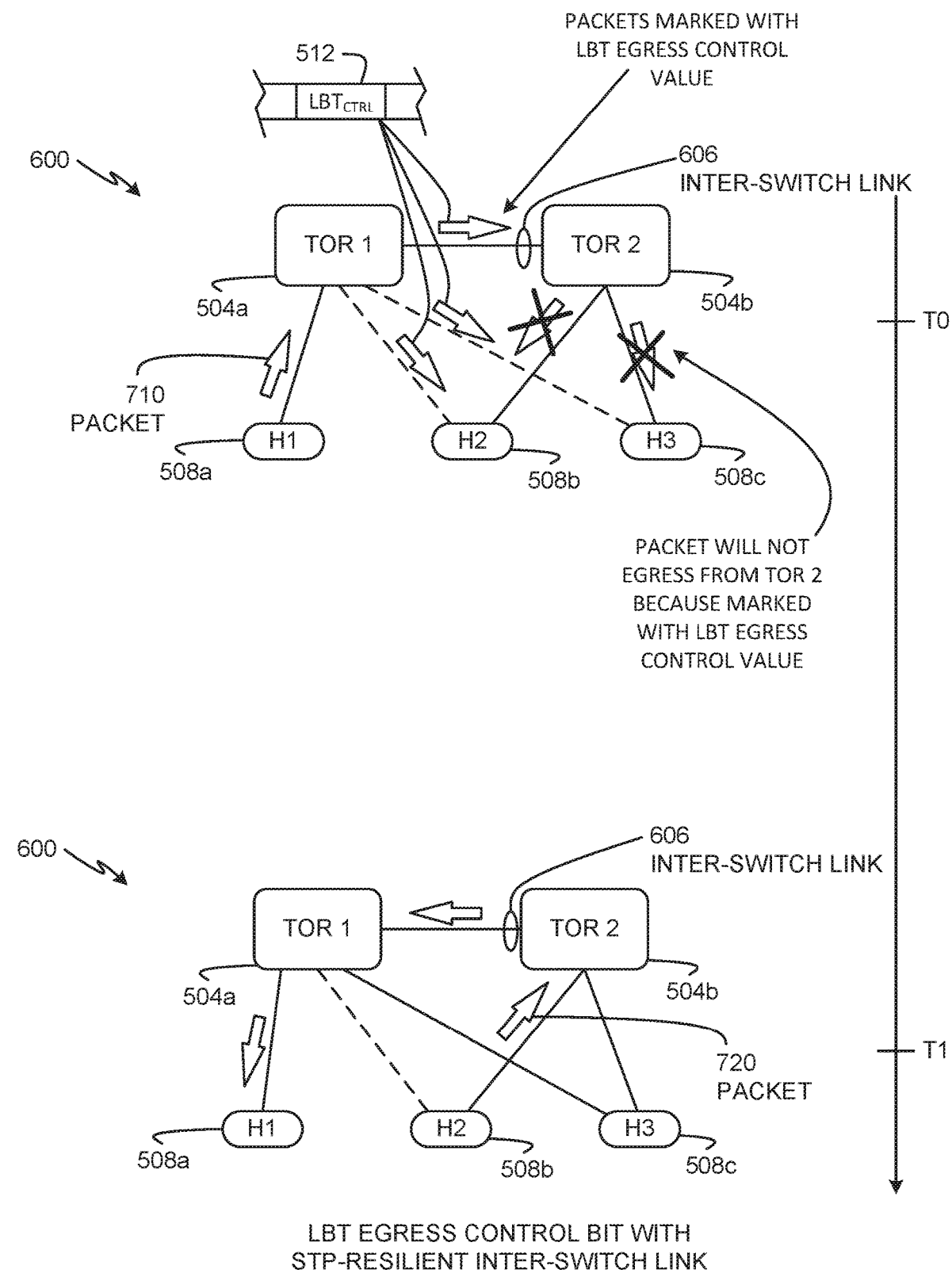
FIG. 7 depicts a disclosed example technique of using LBT egress control values of FIG. 5 in a network topology that includes the inter-switch link between ToR switches of FIG. 6.

FIG. 7 depicts a disclosed example technique of using LBT egress control values as described above in connection with FIG. 5 in a network topology that includes an inter-switch link between ToR switches as described above in connection with FIG. 6. The example of FIG. 7 includes the network topology 600 of FIG. 6 shown during a first time T0 at which an LBT egress control value 512 (FIG. 5) is used to prevent network loops and during a second time Ti in which the inter-switch link 606 is used to overcome network isolation.

At the first time T0 of FIG. 7, the first ToR switch 504a receives a packet 710 from the first host H1 508a. In the illustrated example, the destination node specified in the packet 710 is the second host H2 508b. However, since the first ToR switch 504a is not connected via an active link to the second host H2 508b, the first ToR switch 504a determines that it does not know the network location of the destination node of the packet 710. Based on the network location of the destination node being unknown to the first ToR switch 504a, the first ToR switch 504a determines that it should flood the network with the packet 710 so that the packet will propagate towards its destination node. However, before such flooding, the first ToR switch 504a adds the LBT egress control value 512 to the packet 710 to prevent a network loop as the first ToR switch 504a floods the network with the packet 710. That is, when the first ToR switch 504a broadcasts the packet 710 to the second ToR switch 504b, the second host H2 508b and the third host H3 508c, the LBT egress control value 512 in the packet 710 causes the second ToR switch 504b to not retransmit the packet 710. As such, the packet 710 terminates at the second ToR switch 504b. This is acceptable since the first ToR switch 504b flooded the network with the packet 710 which caused the packet 710 to be delivered to its destination node specified as the second host H2 508b.

The example network topology 600 is also shown at a second time Ti in which the inter-switch link 606 Is used to overcome network isolation of the first host H1 508a from the second host H2 508b and the third host H3 508c. That is, when the first host H1 508a has a failed pNIC through which the first host H1 508a connected to the second ToR switch 504b, the first host H1 508a cannot reach the second and third hosts 508b,c by communicating directly with the second ToR switch 504b. As such, the inter-switch link 606 is connected between the ToR switches 504a,b in the illustrated example of FIG. 7. In this manner, based on the second ToR switch 504b losing network connectivity with the first host H1 508a that is in communication with the first ToR switch 504a, the first ToR switch 504a receives a packet 720 from the second ToR switch 504b via the inter-switch link 606. In the illustrated example, the packet 720 includes a source address corresponding to the second host H2 508b and a destination address corresponding to the first host H1 508a. The first ToR switch 504a then sends the packet 720 to the first host H1 508a. In this manner, the first host H1 508a (identified as the destination node) receives the packet 720 from the first ToR switch 504a without needing to receive the packet 720 from the second ToR switch 504b.

Figure 8:
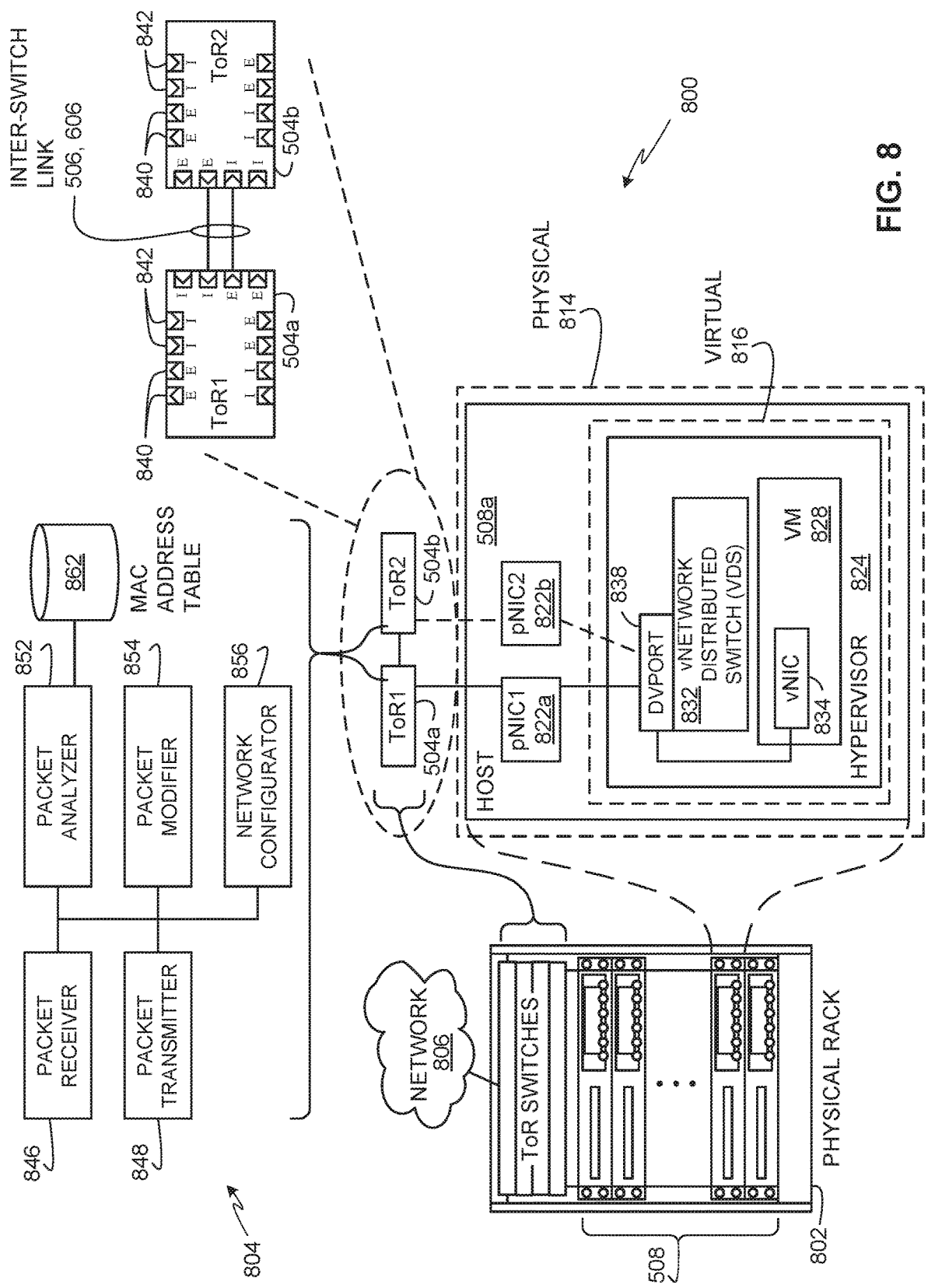
FIG. 8 is a block diagram of an example environment in which the ToR switches and hosts of FIGS. 5-7 are in a physical rack and the ToR switches include an apparatus to implement teachings of this disclosure.

FIG. 8 is a block diagram of an example environment 800 in which the ToR switches 504a,b and hosts 508a-c of FIGS. 5-7 are in a physical rack 802. Also shown in FIG. 8 is an example apparatus 804 provided in both of the ToR switches 504a,b to implement teachings of this disclosure. For ease of illustration, only a single apparatus 804 is shown in the illustrated example of FIG. 8. However, it should be understood that substantially the same apparatus 804 is implemented in both of the ToR switches 504a,b. The example apparatus 804 is provided in the ToR switches 504a,b to insert and/or detect LBT egress control values in packets to prevent the packets from propagating along network loops as disclosed above in connection with FIGS. 5 and 7. The apparatus 804 is also provided in the ToR switches 504a,b to establish inter-switch links between the ToR switches 504a,b to substantially reduce or eliminate network isolation of hosts that lose network connectivity from one of the ToR switches 504a,b.

In the illustrated example, the physical rack 802 is a combination of computing hardware and installed software that may be used by a customer to create and/or add to a virtual computing environment for running VMs and/or containers. The physical rack 802 of the illustrated example can include upwards of 24 hosts 508 which include the hosts 508a-c of FIGS. 5-7. The example hosts 508a-c are in network communication with the ToR switches 504a,b to enable network communications between the hosts 508 through the ToR switches 504a,b. In some examples, the physical rack 802 is physically connected to an external network 806 via the ToR switches 504a,b. In other examples, the ToR switches 504a,b are connected to the external network 806 via a spine switch such as the spine switch 502 of FIG. 5. In some examples, the spine switch 502 can also be used to interconnect the ToR switches 504a,b of the physical rack 802 with other physical racks (e.g., other physical racks in a network environment such as a cloud computing environment).

An example block diagram of the first host H1 508a of FIGS. 5-7 is shown in FIG. 8. The second host H2 508b and the third host H3 508c of FIGS. 5-7 are substantially similar or identical to the first host H1 508a. In the illustrated example of FIG. 8, a physical environment 814 and a virtual environment 816 of the host 508a are shown in detail as connected to the first ToR switch 504a and the second ToR switch 504b. The example physical environment 814 includes the hardware-level components of the host 508a which may include one or more central processing units (CPUs), one or more memory devices, one or more storage units, one or more graphics processing units (GPUs), one or more pNICs, etc. In the illustrated example, two pNICs 822a-b are provided in the host 508a. In other examples, more pNICs (e.g., four pNICs) may be provided in the host 508a. The pNICs 822a,b enable physical network connections between the host 508a and the ToR switches 504a,b.

In the illustrated example of FIG. 8, the host 508a executes an example hypervisor 824, which provides local virtualization services to create the example virtual environment 816 in the host 508a. The example hypervisor 824 may be implemented using any suitable hypervisor (e.g., VMWARE® ESX® hypervisor, Microsoft HYPER-V® hypervisor, and Kernel Based Virtual Machine (KVM)). In the illustrated example of FIG. 8, the hypervisor 824 executes one or more VMs (e.g., an example VM 828) and an example virtual network (vnetwork) distributed switch (VDS) 832. The example VDS 832 functions as a single virtual switch that can be deployed in a single host and/or across multiple hosts. This enables setting virtual network configurations that span across all the member hosts of the VDS 832 and allows VMs to maintain consistent virtual network configurations even when such any such VM is migrated across the multiple member hosts. In the illustrated example, the VM 828 is configured to include a vNICs 834 (although additional vNICs may be configured) for use by applications executed by the VM 828 to perform network communications via the network 808. The example vNIC 834 is created by running virtualization services that enable the VM 828 to employ the pNICs 822a,b of the host 508a through the VDS 832 for network communications. In the illustrated example, the first and second pNICs 822a,b are allocated as physical resources by the hypervisor 824 for use by the VDS 832 and the VM 228 in providing virtual network resources. For example, the hypervisor 824 instantiates a vNIC 834 as a virtual network interface resource, and the VDS 832 instantiates a dvport 838 through which the vNIC 834 connects to the allocated pNICs 811a,b. The example vNIC 834 connects to the ToR switches 504a,b via the pNICs 822a,b. In the illustrated example, the vNIC 834 connects to the pNICs 822a,b through the dvport 838 and the VDS 832 such that the pNICs 822a,b are connected to the VDS 832 and exchange network packets with the vNIC 834 via the VDS 832. The example dvport 838 is assigned a port number by the VDS 832 to identify a source/destination side of a connection that terminates at the hypervisor 824. The VDS 832 uses the port number of the dvport 838 to determine the vNIC 834 and the applications to which received network communications should be delivered.

In the illustrated example, since the ToR switches 504a,b implement an LBT load balancing policy in Active-Passive mode in which a dvport can be active on only one pNIC at a time, the dvport 838 connects to the first ToR switch 504a through the first pNIC 822a via an active link (shown by a solid line) and connects to the second ToR switch 504b through the second pNIC 822b via a passive link (shown by a dashed line). The pNIC 822a may be also be allocated to other vNICs. As such, a total utilization of the pNIC 822a is dependent on the cumulative traffic across all of the vNICs that are assigned to the pNIC 822a. As such, in accordance with an LBT policy, when the pNIC 822a reaches greater than 75% utilization of its bandwidth capacity by all of the vNICs assigned to it, the second pNIC 822b is switched from a passive link to an active link for the vNIC 834, and the first pNIC 822a is switched from an active link to a passive link for the vNIC 834.

The example ToR switches 504a,b are shown in a magnified view in FIG. 8 to show egress ports and ingress ports for receiving and transmitting packets between the two ToR switches 504a,b, between the ToR switches 504a,b and host nodes (e.g., the hosts 508a-c of FIGS. 5-7), and between the ToR switches 504a,b and a spine switch (e.g., the spine switch 502 of FIG. 5). In the illustrated example of FIG. 8, egress ports for outgoing packets are identified by a capital letter "E" and some are indicated by reference numeral 840, and ingress ports for incoming packets are identified by a capital letter "I" and some are indicated by reference numeral 842. In the illustrated example, when an LBT load balancing policy is implemented in the ToR switches 504a, b, some or all of the egress ports 840 and ingress ports 842 are configured as LBT ports (e.g., LBT egress ports 840 and LBT ingress ports 842) for use in accordance with the LBT load balancing policy. In the illustrated example, the inter-switch link 505, 606 of FIGS. 5-7 is shown as implemented by two LBT links between the ToR switches 504a,b in which a first LBT link is formed between an LBT egress port 840 of the second ToR switch 504b and an LBT ingress port 842 of the first ToR switch 504a, and a second LBT link is formed between an LBT egress port 840 of the first ToR switch 504a and an LBT ingress port 842 of the second ToR switch 504b.

Turning in detail to the apparatus 804 of the illustrated example, the apparatus 804 is provided with an example packet receiver 846, an example packet transmitter 848, an example packet analyzer 852, an example packet modifier 854, and an example network configurator 856. The example apparatus 804 is provided with the packet receiver 846 to receive packets (e.g., the packet 510 of FIG. 5, the packet 610 of FIG. 6 and the packets 710 and 720 of FIG. 7). The example apparatus 804 is provided with the packet transmitter 248 to transmit packets. The example apparatus 804 is provided with the packet analyzer 852 to analyze information in received packets. For example, the packet analyzer 852 may analyze a destination address (e.g., MAC addresses) in destination address field of an L2 header of a packet to determine whether the ToR switch 504a,b in which the apparatus 804 is implemented knows the network location of the destination node of that packet. In the illustrated example, the packet analyzer 852 compares the destination addresses of packets to known destination addresses stored in an example MAC address table 862. The MAC address table 862 may be stored in any suitable memory and/or storage device(s) (e.g., the volatile memory 1214, the non-volatile memory 1216, the mass storage 1228, and/or the local memory 1213 of FIG. 12) of the ToR switch 504a,b. In the illustrated example, the ToR switch 504a,b includes the MAC address table 862 to store MAC addresses of pNICs with which the ToR switch 504a,b is connected via an active link. For example, the MAC address table 862 of the first ToR switch 504a stores the MAC address of the pNIC 822a because the pNIC 822a is connected to the first ToR switch 504a via an active link. However, the MAC address table 862 of the second ToR switch 504b does not store the MAC address of the pNIC 822b because the pNIC 822b is connected to the second ToR switch 504b via a passive link. The example packet analyzer 852 also analyzes packet header information (e.g., fields of an L2 packet header) to determine whether an LBT egress control value 512 is set in incoming packets. The example apparatus 804 is provided with the packet modifier 854 to set LBT egress control values 512 in packets of which network locations are unknown to a receiving ToR switch. The example apparatus 804 is provided with the network configurator 856 to establish and/or configure inter-switch links (e.g., the inter-switch link 606 of FIGS. 6 and 7) between the ToR switches 504a,b.

In some examples, the packet analyzer 852 uses the packet transmitter 848 to transmit probe packets from the first ToR switch 504a to the second ToR switch 504b, and uses the packet receiver 846 to receive probe packets at the first ToR switch 504a from the second ToR switch 504b (e.g., transmitted by a packet transmitter 848 of the second ToR switch 504b) to discover whether a spine switch is in network communication with the ToR switches 504a,b. As described above in connection with FIG. 6, when a spine switch is not present, the inter-switch link 606 can be established between the ToR switches 504a,b to substantially reduce or eliminate network isolation of a host that has lost functionality of a pNIC. For example, the packet analyzer 852 may analyze probe packets received at the first ToR switch 504a from the second ToR switch 504b to determine whether they are indicative of the presence of a spine switch. In some examples, the packet analyzer 852 searches for a parameter in the frames of the probe packets that indicates the presence of a spine switch. For example, if a spine switch is present when the second ToR switch 504b transmits probe packets toward the first ToR switch 504a, the packet receiver 846 of the first ToR switch 504a receives some of the probe packets directly from the second ToR switch 504b and receives at least some of the probe packets from the spine switch (e.g., probe packets that flowed from the second ToR switch 504b through the spine switch). The probe packets received at the first ToR switch 504a via the spine switch are modified by the spine switch. For example, the spine switch changes the SMAC (Source MAC) address field of the probe packets to specify its own MAC address. If the packet analyzer 852 of the first ToR switch 504a determines that the SMAC address field of a probe packet transmitted by the second ToR switch 504b has been modified (e.g., a MAC address of the second ToR switch 504b has been replaced with the MAC address of the spine switch), the packet analyzer 852 determines that a spine switch is present in a network path between the ToR switches 504a,b. Under such circumstances in which a spine switch is present, the example network configurator 856 does not establish the inter-switch link 606 between the ToR switches 504a,b. If a spine switch is not present, the example network configurator 856 establishes the inter-switch link 606 between the ToR switches 504a,b. In examples disclosed herein, any suitable type of probe packet may be used to monitor for the presence of spine switches. An example probe packet that provides increased interoperability between different types of switches is an Address Resolution Protocol (ARP) request message. Such an ARP request message may be transmitted between the ToR switches 504a,b based on their internet protocol (IP) addresses. For example, the packet transmitter 848 of the second ToR switch 504b can transmit an ARP request message that includes the IP address of the first ToR switch 504a as a destination address.

While an example manner of implementing the apparatus 804 is illustrated in FIG. 8, one or more of the elements, processes and/or devices illustrated in FIG. 8 may be combined, divided, re-arranged, omitted, eliminated and/or implemented in any other way. Further, the example packet receiver 846, the example packet transmitter 848, the example packet analyzer 852, the example packet modifier 854, the example network configurator 856 and/or, more generally, the example apparatus 804 of FIG. 8 may be implemented by hardware, software, firmware and/or any combination of hardware, software and/or firmware. Thus, for example, any of the example packet receiver 846, the example packet transmitter 848, the example packet analyzer 852, the example packet modifier 854, the example network configurator 856 and/or, more generally, the example apparatus 804 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example packet receiver 846, the example packet transmitter 848, the example packet analyzer 852, the example packet modifier 854, and/or the example network configurator 856 is/are hereby expressly defined to include a non-transitory computer readable storage device or storage disk such as a memory, a digital versatile disk (DVD), a compact disk (CD), a Blu-ray disk, etc. including the software and/or firmware. Further still, the example apparatus 804 of FIG. 8 may include one or more elements, processes and/or devices in addition to, or instead of, those illustrated in FIG. 8, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 9:
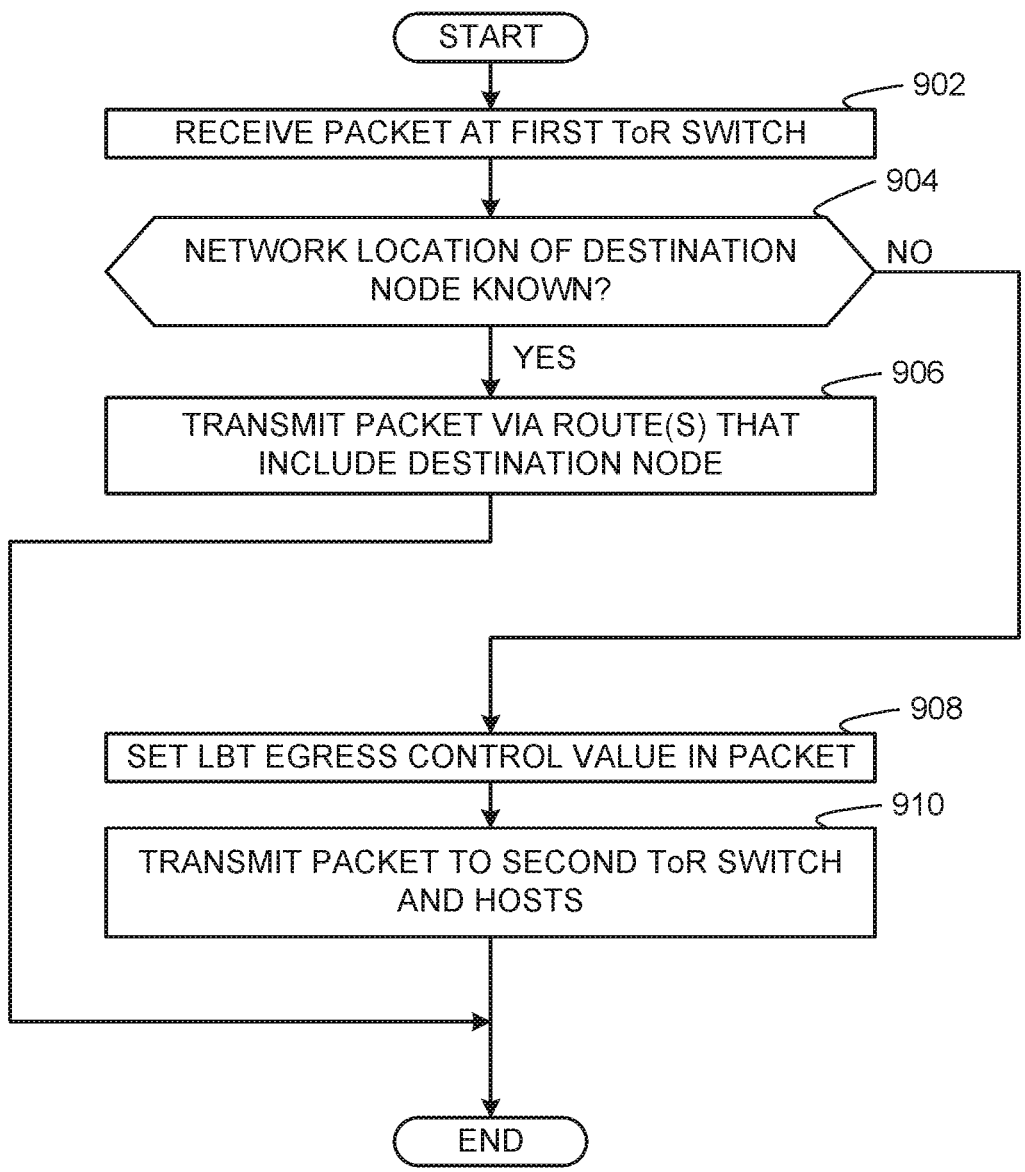
FIG. 9 is a flowchart representative of example machine-readable instructions that may be executed to implement the apparatus of FIG. 8 to substantially reduce or eliminate network congestion effects of network loops by storing LBT egress control values in packets.
Figure 10:
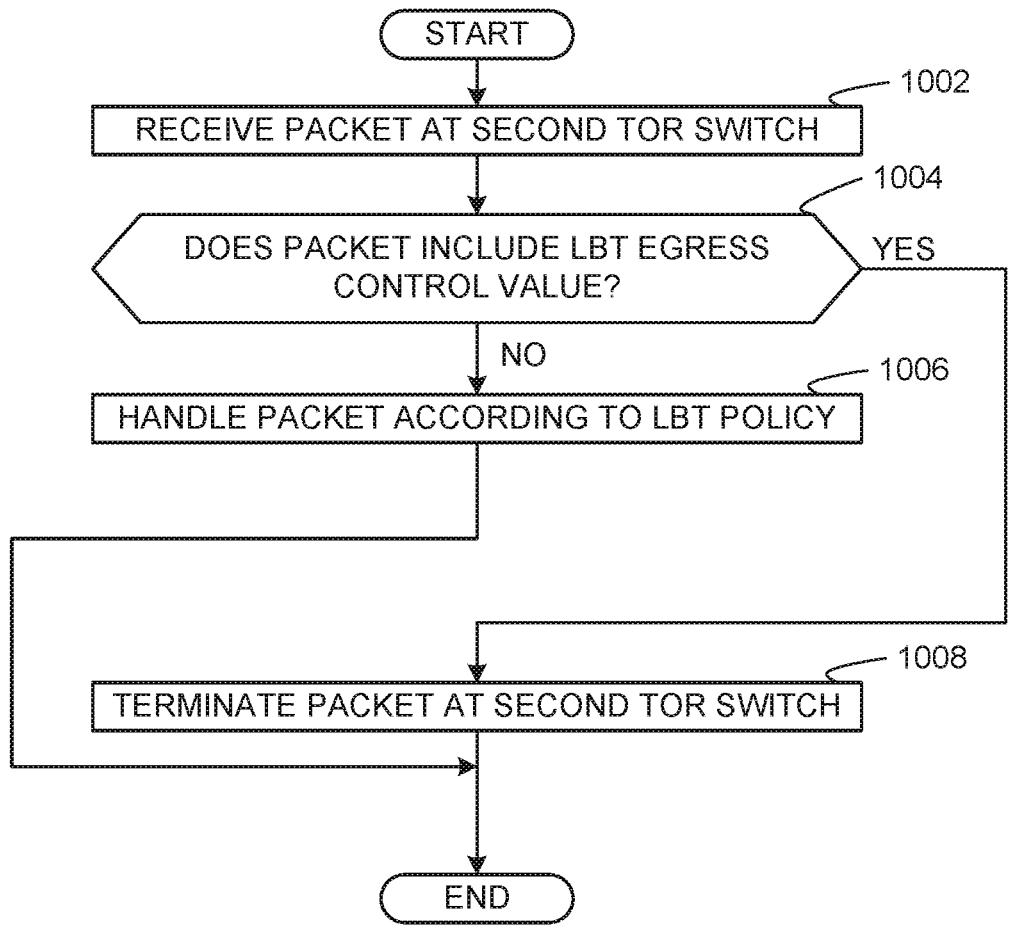
FIG. 10 is a flowchart representative of example machine-readable instructions that may be executed to implement the apparatus of FIG. 8 to process packets that include LBT egress control values to substantially reduce or eliminate network congestion effects of network loops.
Figure 11:
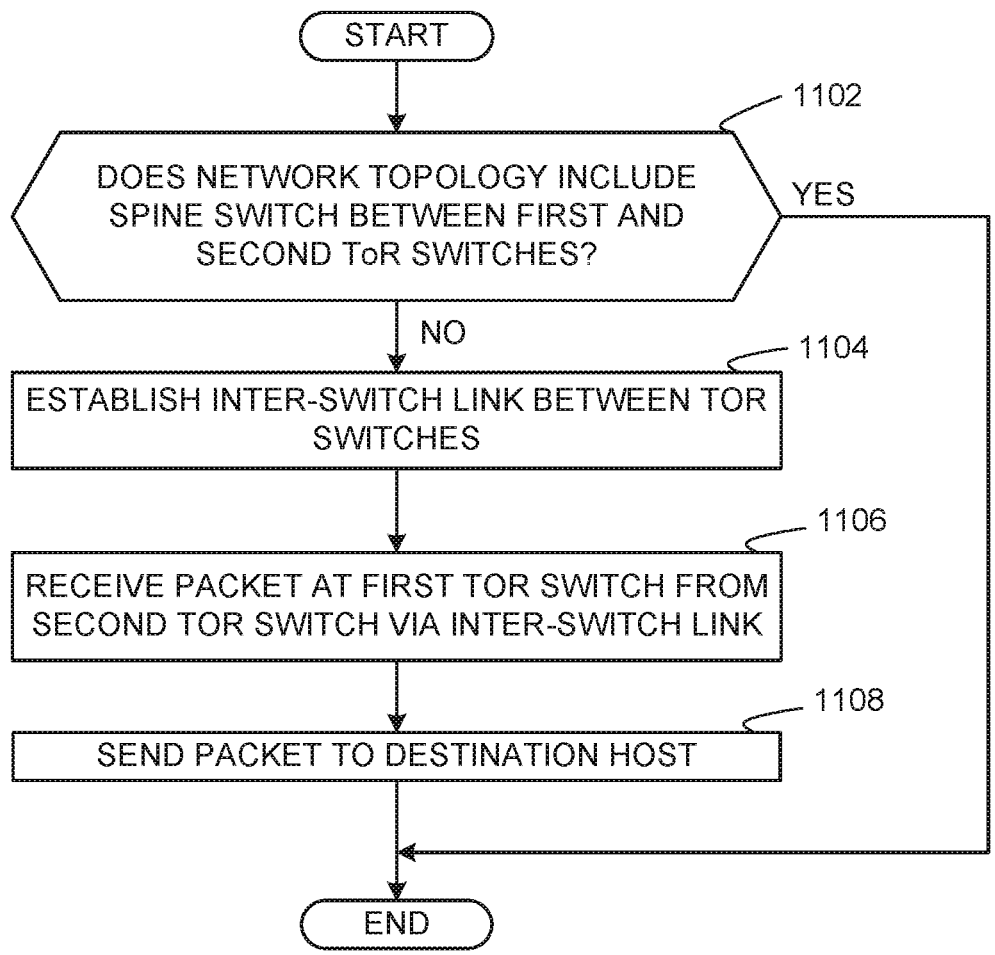
FIG. 11 is a flowchart representative of example machine-readable instructions that may be executed to implement the apparatus of FIG. 8 to substantially reduce or eliminate network isolation by establishing an inter-switch link between ToR switches without use of a spine switch.

Example flowcharts of FIGS. 9-11 are representative of example hardware logic, machine readable instructions, hardware-implemented state machines, and/or any combination thereof for implementing the apparatus 804 of FIG. 8. The machine-readable instructions may be one or more executable programs or portion of one or more executable programs for execution by a computer processor such as the processor 1212 shown in the example processor platform 1200 discussed below in connection with FIG. 12. The program(s) may be embodied in software stored on a non-transitory computer readable storage medium such as a CD-ROM, a floppy disk, a hard drive, a DVD, a Blu-ray disk, or a memory associated with the processor 1212, but the entirety of the program(s) and/or parts thereof could alternatively be executed by a device other than the processor 1212 and/or embodied in firmware or dedicated hardware. Further, although the example program(s) is/are described with reference to the flowcharts illustrated in FIGS. 9-11, many other methods of implementing the example apparatus 804 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 9-11 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C.

FIG. 9 is a flowchart representative of example machine-readable instructions that may be executed to implement the apparatus 804 of FIG. 8 to substantially reduce or eliminate network congestion effects of network loops by storing LBT egress control values (e.g., the LBT egress control value 512 of FIGS. 5 and 7) in packets (e.g., the network packet 510 of FIG. 5 and/or the network packet 710 of FIG. 7). The example process of FIG. 9 is described in connection with FIG. 5. However, it may additionally or alternatively be implemented with the network topology 600 of FIG. 7 at time T0. Turning in detail to FIG. 9, initially at block 902, the example packet receiver 846 (FIG. 8) of the first ToR switch 504a receives a packet 510 at the first ToR switch 504a via a first LBT port (e.g., an LBT ingress port 842 of FIG. 8). At block 904, the example packet analyzer 852 (FIG. 8) of the first ToR switch 504a determines whether a network location of a destination node of the packet 510 is known to the first ToR switch 504a. For example, the packet analyzer 852 retrieves a destination MAC address from the packet 510 and compares the retrieved destination MAC address to known MAC addresses in the MAC address table 862 of the first ToR switch 504a. The network location of the destination node is known to the first ToR switch 504a if the retrieved destination MAC address of the packet 510 matches a known MAC address in the MAC address table 862. Otherwise, the network location of the destination node is unknown to the first ToR switch 504a. If the packet analyzer 852 determines at block 904 that the network location of the destination node of the packet 510 is known to the first ToR switch 504a, control advances to block 906 at which the packet transmitter 848 (FIG. 8) of the first ToR switch 504a transmits the packet 510 along one or more route(s) known to the first ToR switch 504a to include the destination node. For example, the packet transmitter 848 transmits the packet 510 in accordance with a traditional LBT policy toward the destination node corresponding to the destination address identified in the packet 510.

If at block 904 the packet analyzer 852 determines that the network location of the destination node of the packet 510 is unknown to the first ToR switch 504a, control advances to block 908. At block 908, based on the network location being unknown to the first ToR switch 504a, the example packet modifier 854 (FIG. 8) of the first ToR switch 504a sets the LBT egress control value 512 (FIG. 5) in the packet 510. For example, the packet modifier 854 sets the LBT egress control value 512 to indicate that the packet 510 is not to be transmitted via a second LBT port (e.g., an LBT egress port 840) of the second ToR switch 504b. At block 910, the example packet transmitter 848 (FIG. 8) of the first ToR switch 504a transmits the packet 510 from the first ToR switch 504a to the second ToR switch 504b via the inter-switch link 506 between the first and second ToR switches 504a,b and from the first ToR switch 504a to one or more hosts 508a,b (FIG. 5) connected to the first ToR switch 504a. For example, the first ToR switch 504a may transmit the packet 510 by broadcasting or multicasting the packet 510 via its egress ports 840 to all of its connected next hops. As such, since the packet 510 is broadcast or multicast to all hosts connected to the first ToR switch 504a, the packet 510 reaches one of the hosts 508a,b that is identified in the packet 510 as the destination node (e.g., based on the destination address in the packet 510). The example process of FIG. 9 then ends.

FIG. 10 is a flowchart representative of example machine-readable instructions that may be executed to implement the apparatus 804 of FIG. 8 to process packets that include LBT egress control values 512 to substantially reduce or eliminate network congestion effects of network loops. The example process of FIG. 10 is described in connection with FIG. 5. However, it may additionally or alternatively be implemented with the network topology 600 of FIG. 7 at time T0. The example process of FIG. 10 is described as being implemented by the second ToR switch 504b of FIGS. 5, 7, and 8 after receiving the packet 510 (and its included LBT egress control value 512) that was transmitted by the first ToR switch 504a at block 910 of FIG. 9.

Turning in detail to FIG. 10, initially at block 1002, the example packet receiver 846 (FIG. 8) of the second ToR switch 504b receives the packet 510 at the second ToR switch 504b. For example, the packet receiver 846 receives the packet 510 via an LBT ingress port 842 (FIG. 8) of the second ToR switch 504b. At block 1004, the example packet analyzer 852 (FIG. 8) of the second ToR switch 504b determines whether the packet 510 includes an LBT egress control value 512. For example, the packet analyzer 852 may retrieve a value stored in an LBT egress control field of an L2 packet header of the packet 510 to determine whether the LBT egress control value 512 is stored in the packet 510 to indicate that the second ToR switch 504b is not to further forward the packet 510. If at block 1004 the example packet analyzer 852 determines that the packet 510 does not include the LBT egress control value 512, control advances to block 1006 at which the packet transmitter 848 (FIG. 8) of the second ToR switch 504b handles the packet 510 in accordance with a traditional LBT policy. For example, the packet transmitter 848 of the second ToR switch 504b transmits the packet 510 in accordance with a traditional LBT policy via an LBT egress port 840 (FIG. 8) along one or more route(s) known to the second ToR switch 504b to include the destination node corresponding to the destination address identified in the packet 510.

If at block 1004 the example packet analyzer 852 determines that the packet 510 does include the LBT egress control value 512, control advances to block 1008 at which the packet modifier 854 of the second ToR switch 504b terminates the packet 510 at the second ToR switch 504b. For example, the packet modifier 854 may mark the packet 510 as invalid to be discarded, or may modify the destination address of the packet 510 to be the destination address of the second ToR switch 504b so that the packet 510 is not further forwarded by the packet transmitter 848. The example process of FIG. 10 then ends.

FIG. 11 is a flowchart representative of example machine-readable instructions that may be executed to implement the apparatus 804 of FIG. 8 to substantially reduce or eliminate network isolation by establishing an inter-switch link (e.g., the inter-switch link 606 of FIGS. 6 and 7) between the ToR switches 504a,b without use of a spine switch (e.g., the spine switch 502 of FIG. 5). The example process of FIG. 11 is described in connection with FIG. 6. However, it may additionally or alternatively be implemented with the network topology 600 of FIG. 7 at time Ti. Initially at block 1102, the packet analyzer 852 of the first ToR switch 504a determines whether the network topology 600 includes a spine switch connected between the first ToR switch 504a and the second ToR switch 504b. For example, the packet analyzer 852 may analyze probe packets received by the packet receiver 846 of the first ToR switch 504a via one or more ingress ports 842 (FIG. 8). The probe packets are transmitted by the second ToR switch 504b to discover whether there is a spine switch in connection with the first ToR switch 504a and the second ToR switch 504b. In this manner, the packet analyzer 852 can analyze the received probe packets to determine whether any is indicative of a spine switch connected between the first ToR switch 504a and the second ToR switch 504b. For example, the packet analyzer 852 may analyze the received probe packets to determine whether any has been modified by a spine switch as described above in connection with FIG. 8.

If the packet analyzer 852 determines at block 1102 that a spine switch is present, the example process of FIG. 11 ends. Otherwise, if the packet analyzer 852 determines at block 1102 that a spine switch is not present, control advances to block 1104 at which the example network configurator 856 (FIG. 8) of the first ToR switch 504a establishes the inter-switch link 606 between the ToR switches 504a,b. For example, the network configurator 856 of the first ToR switch 504a configures an LBT egress port 840 (FIG. 8) of the first ToR switch 504a to enable the LBT egress port 840 for communication with the second ToR switch 504b. In addition, the network configurator 856 of the first ToR switch 504a signals a second network configurator (similar or the same as the network configurator 856) of the second ToR switch 504b to cause the second network configurator of the second ToR switch 504b to configure an LBT ingress port 842 of the second ToR switch 504b corresponding to a link connected to the enabled LBT egress port 840 of the first ToR switch 504a. In this manner, the second network configurator of the second ToR switch 504b enables the LBT ingress port 842 for communication with the first ToR switch 504a so that the inter-switch link 606 is established between the LBT egress port 840 of the first ToR switch 504a and the LBT ingress port 842 of the second ToR switch 504b.

In the illustrated example, based on the second ToR switch 504b losing network connectivity with the first host H1 508a (FIG. 6) that is in communication with the first ToR switch 504a, the packet receiver 846 (FIG. 8) of the first ToR switch 504a receives the packet 610 (FIG. 6) at the first ToR switch 504a from the second ToR switch 504b via the inter-switch link 606 (block 1106). In the illustrated example, the packet 610 includes a source MAC address corresponding to the second host H2 508b and a destination MAC address corresponding to the first host H2 508a. At block 1108, the example packet transmitter 848 of the first ToR switch 504a sends the packet 610 to the destination host. For example, the packet transmitter 848 sends the packet 610 from the first ToR switch 504a to the first host H1 508a without the first host H1 508a receiving the packet 610 from the second ToR switch 504b. The example process of FIG. 11 then ends.

Figure 12:
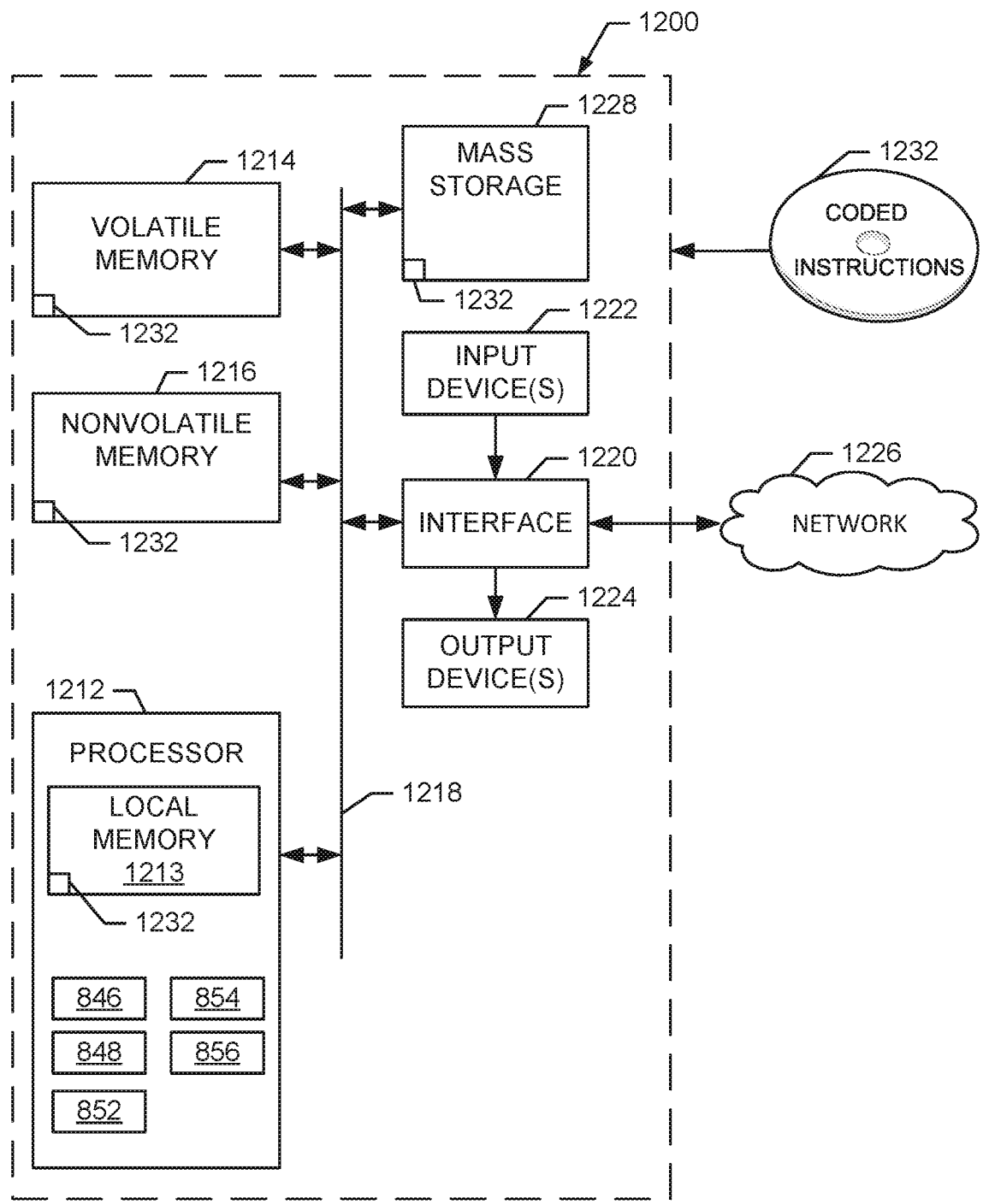
FIG. 12 is a block diagram of an example processor platform structured to execute the machine-readable instructions represented in FIGS. 9-11 to implement the apparatus of FIG. 8 to use LBT egress control values to substantially reduce or eliminate network congestion effects of network loops and to establish inter-switch links between ToR switches to substantially reduce or eliminate network isolation of hosts.

FIG. 12 is a block diagram of an example processor platform 1200 structured to execute the machine-readable instructions represented in FIGS. 9-11 to implement the apparatus 804 of FIG. 8 to use LBT egress control values (e.g., the LBT egress control value 512 of FIGS. 5 and 7) to substantially reduce or eliminate network congestion effects network loops and to establish inter-switch links (e.g., the inter-switch link 606 of FIGS. 6 and 7) between ToR switches (e.g., the ToR switches 504a,b of FIGS. 5-8) to substantially reduce or eliminate network isolation of hosts. The processor platform 1200 can be, for example, a server, a personal computer, a workstation, a self-learning machine (e.g., a neural network), an Internet appliance, or any other type of computing device.

The processor platform 1200 of the illustrated example includes a processor 1212. The processor 1212 of the illustrated example is hardware. For example, the processor 1212 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 1212 implements the example packet receiver 846, the example packet transmitter 848, the example packet analyzer 852, the example packet modifier 854, and the example network configurator 856 of the example apparatus 804 of FIG. 8.

The processor 1212 of the illustrated example includes a local memory 1213 (e.g., a cache). The processor 1212 of the illustrated example is in communication with a main memory including a volatile memory 1214 and a non-volatile memory 1216 via a bus 1218. The volatile memory 1214 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1216 may be implemented by flash memory and/or any other desired type of memory device. Access to the main memory 1214, 1216 is controlled by a memory controller.

The processor platform 1200 of the illustrated example also includes an interface circuit 1220. The interface circuit 1220 may be implemented by any type of interface standard, such as an Ethernet interface, a universal serial bus (USB), a Bluetooth® interface, a near field communication (NFC) interface, and/or a PCI express interface.

In the illustrated example, one or more input devices 1222 are connected to the interface circuit 1220. The input device(s) 1222 permit(s) a user to enter data and/or commands into the processor 1212. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1224 are also connected to the interface circuit 1220 of the illustrated example. The output devices 1224 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1220 of the illustrated example, thus, typically includes a graphics driver card, a graphics driver chip and/or a graphics driver processor.

The interface circuit 1220 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1226. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1200 of the illustrated example also includes one or more mass storage devices 1228 for storing software and/or data. Examples of such mass storage devices 1228 include floppy disk drives, hard drive disks, compact disk drives, Blu-ray disk drives, redundant array of independent disks (RAID) systems, and digital versatile disk (DVD) drives.

Example machine executable-instructions 1232 represented by the flowcharts of FIGS. 9-11 may be stored in the mass storage device 1228, in the volatile memory 1214, in the non-volatile memory 1216, and/or on a removable non-transitory computer readable storage medium such as a CD or DVD.

From the foregoing, it will be appreciated that example methods, apparatus and articles of manufacture have been disclosed to substantially reduce network congestion that is sometimes created by network loops in a physical network. For example, physical networks of some physical rack architectures include network loops in which multiple paths to destination nodes include one or more paths that form loops along which packets to those destination nodes travel repeatedly without terminating at their destination nodes. Such network loops can lead to network traffic congesting or saturating network resources along network loops. To overcome such network congestion, examples disclosed herein provide LBT egress control values in network packets to substantially reduce or eliminate network congestion effects of network loops. In this manner, network packets do not unnecessarily consume network resources and decrease network performance by causing the network resources along network loops to continuously process looping network packets. Thus, examples disclosed herein to locate LBT egress control values in network packets are useful to substantially reduce or eliminate packets repeatedly following network loops along physical network topologies. By using LBT egress control values as disclosed herein, network loop avoidance by an LBT policy is no longer dependent on network topology. Instead, in examples disclosed herein, LBT egress control values are used to control how nodes at subsequent hops handle incoming network packets in network configurations employing LBT policies so that the network packets do not flow repeatedly along network loops in physical networks.

In addition, examples disclosed herein also substantially reduce or eliminate network isolation of hosts by programmatically adding inter-switch links between ToR switches at physical networks. For example, physical networks of some physical rack architectures include nodes that are in circuit with ToR switches but do not have a redundant path to other nodes when one of the ToR switches fails. As such, when a connection between a node and a first ToR switch fails, the node becomes isolated from other nodes in circuit with the first ToR switch and, thus, is unreachable by those nodes. Examples disclosed herein establish inter-switch links between ToR switches to substantially reduce or eliminate network isolation of hosts. Such inter-switch links can remain in a network topology so that when a packet sent from a host in circuit with one ToR switch is destined to a host in circuit with another ToR switch, the network packet can travel between the ToR switches through the inter-switch link to reach the destination host. In this manner, network path redundancy can be provided by programming physical networks at ToR switches to establish inter-switch links without needing to communicate with hypervisors in hosts to control programming of virtual networks at the hosts. This simplifies management of networks in a physical rack architecture by controlling redundant, failover path configurations by ToR switches at the physical network. Thus, examples disclosed herein are directed to one or more improvements in the functioning of network devices, computers, and computer networks.

Examples disclosed herein may be used with one or more different types of virtualization environments. Three example types of virtualization environments are: full virtualization, paravirtualization, and OS virtualization. Full virtualization, as used herein, is a virtualization environment in which hardware resources are managed by a hypervisor to provide virtual hardware resources to a VM. In a full virtualization environment, the VMs do not have access to the underlying hardware resources. In a typical full virtualization, a host OS with embedded hypervisor (e.g., a VMWARE® ESXI® hypervisor) is installed on the server hardware. VMs including virtual hardware resources are then deployed on the hypervisor. A guest OS is installed in the VM. The hypervisor manages the association between the hardware resources of the server hardware and the virtual resources allocated to the VMs (e.g., associating physical RAM with virtual RAM). Typically, in full virtualization, the VM and the guest OS have no visibility and/or access to the hardware resources of the underlying server. Additionally, in full virtualization, a full guest OS is typically installed in the VM while a host OS is installed on the server hardware. Example virtualization environments include VMWARE® ESX® hypervisor, Microsoft HYPER-V® hypervisor, and Kernel Based Virtual Machine (KVM).

Paravirtualization, as used herein, is a virtualization environment in which hardware resources are managed by a hypervisor to provide virtual hardware resources to a VM, and guest OSs are also allowed to access some or all the underlying hardware resources of the server (e.g., without accessing an intermediate virtual hardware resource). In a typical paravirtualization system, a host OS (e.g., a Linux-based OS) is installed on the server hardware. A hypervisor (e.g., the XEN® hypervisor) executes on the host OS. VMs including virtual hardware resources are then deployed on the hypervisor. The hypervisor manages the association between the hardware resources of the server hardware and the virtual resources allocated to the VMs (e.g., associating RAM with virtual RAM). In paravirtualization, the guest OS installed in the VM is configured also to have direct access to some or all of the hardware resources of the server. For example, the guest OS may be precompiled with special drivers that allow the guest OS to access the hardware resources without passing through a virtual hardware layer. For example, a guest OS may be precompiled with drivers that allow the guest OS to access a sound card installed in the server hardware. Directly accessing the hardware (e.g., without accessing the virtual hardware resources of the VM) may be more efficient, may allow for performance of operations that are not supported by the VM and/or the hypervisor, etc.

OS virtualization is also referred to herein as container virtualization. As used herein, OS virtualization refers to a system in which processes are isolated in an OS. In a typical OS virtualization system, a host OS is installed on the server hardware. Alternatively, the host OS may be installed in a VM of a full virtualization environment or a paravirtualization environment. The host OS of an OS virtualization system is configured (e.g., utilizing a customized kernel) to provide isolation and resource management for processes that execute within the host OS (e.g., applications that execute on the host OS). Thus, a process executes within a container that isolates the process from other processes executing on the host OS. Thus, OS virtualization provides isolation and resource management capabilities without the resource overhead utilized by a full virtualization environment or a paravirtualization environment. Example OS virtualization environments include Linux Containers LXC and LXD, the DOCKER™ container platform, the OPENVZ™ container platform, etc.

In some examples, a data center (or pool of linked data centers) may include multiple different virtualization environments. For example, a data center may include hardware resources that are managed by a full virtualization environment, a paravirtualization environment, and/or an OS virtualization environment. In such a data center, a workload may be deployed to any of the virtualization environments. Examples disclosed herein may be implemented in any one or more of the multiple different virtualization environments.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A first server host comprising:
   at least one memory;
   instructions in the first server host; and
   processor circuitry to execute the instructions to:
   connect a virtual network interface card (vNIC) of the first server host to a first physical network interface card (pNIC) of the first server host and to a second pNIC of the first server host;
   establish an inter-switch link between a first switch and a second switch, the first switch and the first server host in a first network fabric, the second switch and a second server host in a second network fabric; and
   cause transmission of a first network packet and a second network packet from the vNIC of the first server host, the first and second network packets to be delivered to the second server host via the inter-switch link, the first network packet to be transmitted via the first pNIC when utilization of the first pNIC does not satisfy a threshold, the second network packet to be transmitted via the second pNIC when the utilization of the first pNIC satisfies the threshold.

2. The first server host of claim 1, wherein the processor circuitry is to determine the utilization of the first pNIC based on cumulative network egress traffic across the first pNIC.

3. The first server host of claim 1, wherein the processor circuitry is to determine if the first switch includes a network location of the second server host in a media access control address table.

4. The first server host of claim 1, wherein the first network packet is a probe network packet to determine whether a spine switch communicatively couples the first switch and the second switch.

5. The first server host of claim 4, wherein the processor circuitry is to parse the probe network packet to determine whether a modification has been made to a source media access control address field of the probe network packet.

6. The first server host of claim 1, wherein the processor circuitry is to add a load-based teaming egress control value to the second network packet.

7. The first server host of claim 6, wherein the processor circuitry is to terminate the second network packet at the second switch based on a modification of a destination address of the second network packet.

8. At least one non-transitory computer readable medium comprising instructions which, when executed by a first server host, cause processor circuitry to at least:
 connect a virtual network interface card (vNIC) of the first server host to a first physical network interface card (pNIC) and a second pNIC of the first server host;
 establish an inter-switch link between a first switch and a second switch, the first switch and the first server host in a first network fabric, the second switch and a second server host in a second network fabric; and
 cause transmission of a first network packet and a second network packet from the vNIC of the first server host, the first and second network packets to be delivered to the second server host via the inter-switch link, the first network packet to be transmitted via the first pNIC when utilization of the first pNIC does not exceed a threshold, the second network packet to be transmitted via the second pNIC when the utilization of the first pNIC exceeds the threshold.

9. The at least one non-transitory computer readable medium of claim 8, wherein the instructions, when executed, cause the processor circuitry to determine the utilization of the first pNIC based on cumulative network egress traffic across the first pNIC.

10. The at least one non-transitory computer readable medium of claim 8, wherein the instructions, when executed, cause the processor circuitry to determine if the first switch includes a network location of the second server host in a media access control address table.

11. The at least one non-transitory computer readable medium of claim 8, wherein the first network packet is a probe network packet that is transmitted to determine whether a spine switch is connected between the first switch and the second switch.

12. The at least one non-transitory computer readable medium of claim 11, wherein the instructions, when executed, cause the processor circuitry to determine whether a modification has been made to a source media access control address field of the probe network packet.

13. The at least one non-transitory computer readable medium of claim 8, wherein the instructions, when executed, cause the processor circuitry to add a load-based teaming egress control value to the second network packet.

14. The at least one non-transitory computer readable medium of claim 13, wherein the instructions, when executed, cause the processor circuitry to terminate the second network packet at the second switch based on a modification of a destination address of the second network packet.

15. A method comprising:
 connecting, by executing an instruction with processor circuitry, a virtual network interface card (vNIC) of a first server host to a first physical network interface card (pNIC) of the first server host and to a second pNIC of the first server host;
 establishing, by executing an instruction with the processor circuitry, an inter-switch link between a first switch and a second switch, the first switch and the first server host in a first network fabric, the second switch and a second server host in a second network fabric; and
 causing, by executing an instruction with the processor circuitry, transmission of a first network packet and a second network packet from the vNIC of the first server host, the first and second network packets to be delivered to the second server host via the inter-switch link, the first network packet to be transmitted via the first pNIC when utilization of the first pNIC does not satisfy a threshold value, the second network packet to be transmitted via the second pNIC when the utilization of the first pNIC satisfies the threshold value.

16. The method of claim 15, further including determining the utilization of the first pNIC based on cumulative network egress traffic across the first pNIC.

17. The method of claim 15, further including determining whether a media access control address table of the first switch includes a network location of the second server host.

18. The method of claim 15, wherein the first network packet is a probe network packet that is transmitted to determine whether a spine switch is connected between the first switch and the second switch.

19. The method of claim 18, further including determining whether a modification has been made to a source media access control address field of the probe network packet.

20. The method of claim 15, further including adding a load-based teaming egress control value to the second network packet.

21. The method of claim 20, further including terminating the second network packet at the second switch based on a modification of a destination address of the second network packet.

* * * * *